US010380829B2

(12) United States Patent
Takasaki et al.

(10) Patent No.: US 10,380,829 B2
(45) Date of Patent: Aug. 13, 2019

(54) CARD GAME APPARATUS AND SOFTWARE PROGRAM

(71) Applicant: SEGA SAMMY CREATION INC., Yokohama-shi, Kanagawa (JP)

(72) Inventors: Yuichi Takasaki, Tokyo (JP); Masato Ito, Tokyo (JP)

(73) Assignee: SEGA SAMMY CREATION INC., Yokohama-shi, Kanagawa (JP)

( * ) Notice: Subject to any disclaimer, the term of this patent is extended or adjusted under 35 U.S.C. 154(b) by 0 days.

(21) Appl. No.: 15/574,000

(22) PCT Filed: May 18, 2015

(86) PCT No.: PCT/JP2015/064242

§ 371 (c)(1),
(2) Date: Nov. 14, 2017

(87) PCT Pub. No.: WO2016/185548

PCT Pub. Date: Nov. 24, 2016

(65) Prior Publication Data

US 2018/0293835 A1 Oct. 11, 2018

(51) Int. Cl.
*G06F 17/00* (2019.01)
*G07F 17/32* (2006.01)

(52) U.S. Cl.
CPC ...... *G07F 17/3211* (2013.01); *G07F 17/3227* (2013.01); *G07F 17/3293* (2013.01)

(58) Field of Classification Search
None
See application file for complete search history.

(56) References Cited

U.S. PATENT DOCUMENTS

| | | | |
|---|---|---|---|
| 7,758,425 | B2 | 7/2010 | Poh et al. |
| 2007/0004512 | A1 | 1/2007 | Toyoda |
| 2010/0304816 | A1 | 12/2010 | Kitamura et al. |
| 2013/0005456 | A1 | 1/2013 | Okujo et al. |

FOREIGN PATENT DOCUMENTS

| | | | |
|---|---|---|---|
| JP | 2006-223588 | A | 8/2006 |
| JP | 2010-273867 | A | 12/2010 |
| JP | 2013-013471 | A | 1/2013 |

*Primary Examiner* — Paul A D'Agostino
(74) *Attorney, Agent, or Firm* — Drinker Biddle & Reath LLP

(57) ABSTRACT

There are provided a squeeze image generating portion generating a squeeze image showing a squeeze motion of a card being turned over from an end, from a back surface to a front surface; and a game controlling portion controlling progress of a card game on the basis of a score recorded on a front surface of the card. By discontinuing the squeeze motion at branching timings at which a score predicted by a part of one or more suits appearing according to progress of the squeeze motion changes, it becomes possible to discontinue the squeeze motion at an appropriate timing according to a progress state of the card game, and it is possible to provide a realistic game environment close to a real card game and save time taken for useless squeeze motions.

7 Claims, 18 Drawing Sheets

| No. | Target card | Motion 1 | Motion 2 | Motion 3 | Motion 4 |
|---|---|---|---|---|---|
| 1 | First four cards | Appears with back exposed | | | |
| 2 | P: first card; B: first card | *Turned over quickly* | | | |
| 3 | P: second card; B: second card | Perform squeeze without haste | Perform squeeze without haste | Perform squeeze without haste | Perform squeeze without haste and finish turn-over |
| 4 | P: second card; B: second card | Perform squeeze without haste | Perform squeeze without haste | Turned over after stop | |
| 5 | P: second card; B: second card | Perform squeeze without haste | Quickly perform squeeze | Quickly perform squeeze | Quickly perform squeeze and finish turn-over |
| 6 | P: second card; B: second card | Perform squeeze without haste | Turned over after stop | | |
| 7 | P: second card; B: second card | Perform squeeze without haste | Turned over after stop | | |
| 8 | P: third card; B: third card | Appears with back exposed | | | |
| 9 | P: third card; B: third card | Perform squeeze without haste | Perform squeeze without haste | Perform squeeze without haste | Perform squeeze without haste and finish turn-over |
| 10 | P: third card; B: third card | Perform squeeze without haste | Perform squeeze without haste | Turned over after stop | |
| 11 | P: third card; B: third card | Perform squeeze without haste | Quickly perform squeeze | Quickly perform squeeze | Quickly perform squeeze and finish turn-over |
| 12 | P: third card; B: third card | Perform squeeze without haste | Turned over after stop | | |
| 13 | P: third card; B: third card | Perform squeeze without haste | Turned over after stop | | |
| 14 | P: third card; B: third card | Falls down sideways, and front is exposed | | | |

Branch 0 Branch 1 Branch 2 Branch 3

| | |
|---|---|
| Turned over after stop | - Card is tuned over after stopping for less than 1 second. Motion with feeling of being abandoned. |
| Falls down sideways, and front is exposed | - Front of card is exposed in a manner as if card were falling down so that card is not bent. |

*FIG. 17*

CARD GAME APPARATUS AND SOFTWARE PROGRAM

CROSS-REFERENCE TO RELATED APPLICATIONS

This application is the U.S. national phase of the International Patent Application No. PCT/JP2015/064242 filed May 18, 2015, the entire content of which is incorporated herein by reference.

TECHNICAL FIELD

The present disclosure relates to a card game apparatus and a software program.

BACKGROUND

A card game apparatus in which a card game is executed by a computer has been developed. For example, Japanese Patent Application Laid-Open No. 2013-013471 A discloses a game apparatus configured so that a state of a table game such as baccarat on a dealer's game table is photographed by a photographing camera and delivered to a plurality of participant terminals via a network, and result information and dividend information about the game is managed by a management server.

Here, in a card game such as baccarat actually played in a casino, there may be a case where an outcome of a game on which a lot of money is bet is decided by a score (a number) recorded on one card. In such a situation, a user who has bet a lot of money slowly turns over a card that decides an outcome of a game from a state that the card is laid down so that a score is not seen, by bending an end of the card while praying that good luck will come. From such a state of the motion, the motion of turning over a card while bending the card is referred to as a "squeeze motion". For example, in Specification of U.S. Pat. No. 7,758,425, in order to provide an image of this "squeeze motion", a virtual image of a virtually displayed card being turned over from an end is provided by detecting a continuous contact motion on a touch screen by a user (FIG. 4a). If such a system is used, it becomes possible to simulate the "squeeze motion" on an image of a virtually realistic card. By introducing the system especially into a casino, it is possible to give a user a feeling of anticipation similar to the case of using real cards.

SUMMARY

In the system described in Patent Literature 2, however, though it makes it possible to virtually experience a squeeze motion by operating a touch panel, it is not possible to respond to a request to discontinue the "squeeze motion" that is frequently seen in an actual game such as baccarat.

Specifically, in an actual baccarat game, when a user slowly turns over a card, hiding a number on an end of the card with his finger, a part of a suit (or suits) on a front side appears. Even if the card is not completely turned over, it becomes possible to narrow down a range of a predicted score (a predicted number) of the card that is expected to some extent by an arrangement of the suit (suits).

Here, if all predicted scores apparently indicate that the user who is performing the squeeze motion cannot win, the user gives up winning the game and wants to discontinue the squeeze motion, immediately turn over the card and proceed to the next game. Such a situation that it is appropriate to discontinue a squeeze motion can frequently occur. On the other hand, if any of the predicted scores is still a score with which the user may win, there may be a case where the user has a feeling of high tension that he may win more strongly and wants to continue the squeeze motion.

Thus, the user wants to turn over a card and immediately finish the game when he knows that he has no chance of winning, while he wants to continuously play squeeze if there is a possibility of winning. Further, from an operator's standpoint that the number of game plays should be increased, there is a demand for saving time taken for unnecessary motions as much as possible.

A timing at which the user wants to stop a squeeze motion is not always the same. The number of suits which come to be seen as a squeeze motion progresses changes every moment, and a predicted score changes at a timing at which it is identified that a new suit comes to be seen (does not come to be seen). Therefore, there are a lot of stages of the timing at which the user wants to discontinue a squeeze motion according to a progress state of a game.

Therefore, in view of the above problem, one of objects of the present disclosure is to provide a card game technique enabling an efficient game play close to an actual card game by discontinuing a squeeze motion at an appropriate timing according to a progress state of a card game.

In order to solve the above problem, the present disclosure is provided with the following configuration.

(1) A card game apparatus of the present disclosure is provided with a squeeze image generating portion generating a squeeze image showing a squeeze motion of a card being turned over from an end, from a back surface to a front surface; and a game controlling portion controlling progress of a card game. The squeeze motion is discontinued at a branching timing at which a score predicted by a part of one or more suits appearing with the progress of the squeeze motion changes.

Further, a software program of the present disclosure is provided with a function of generating a squeeze image showing a squeeze motion of a card being turned over from an end, from a back surface to a front surface; a function of controlling progress of a card game; and a function of discontinuing the squeeze motion at a branching timing at which a score predicted by a part of one or more suits appearing with the progress of the squeeze motion changes.

The present disclosure may be provided with the following configurations if desired.

(2) The branching timing is any of:

1) a timing at which existence/non-existence of a picture is identified;

2) a timing at which existence/non-existence of suits arranged in line along a first side of the card or the number of the suits arranged in line along the first side is identified;

3) a timing at which existence/non-existence of suits arranged in line along a second side of the card or the number of the suits arranged in line along the second side is identified; and 4) a timing at which the score is decided.

(3) As the squeeze motion, plural kinds of squeeze motions are set according to conditions for discontinuing the squeeze motion; and the game controlling portion holds a squeeze selection table showing relationships between progress states of the card game and squeeze motions to be selected according to the progress states, and selects one squeeze motion from the squeeze selection table according to a progress state of the card game.

(4) The plural kinds of squeeze motions include a plurality among:

1) a first squeeze motion of discontinuing the squeeze motion at a branching timing at which it is identified that the predicted score reaches a target score;

2) a second squeeze motion of discontinuing the squeeze motion at a branching timing at which the score is decided;

3) a third squeeze motion of discontinuing the squeeze motion at a branching timing at which it is identified that the predicted score is below an opponent's score; and 4) a turn-over motion of turning over the card from the back surface to the front surface without comprising the squeeze motion.

(5) The squeeze image generating portion is capable of changing speed of the squeeze motion; and the game controlling portion changes the speed of the squeeze motion according to a currently acquired score at the branching timing.

(6) The game controlling portion decides whether the squeeze motion is to be performed or not, according to a progress state of the card game.

According to the present disclosure, since a squeeze motion is discontinued at branching timings at which a number of a predicted score, which is predicted by a part of a suit (or suits) appearing according to progress of the squeeze motion, changes, it becomes possible to discontinue the squeeze motion at an appropriate timing according to a progress state of the card game, and it is possible to provide a realistic game environment close to a real card game and save time taken for useless squeeze motions.

BRIEF DESCRIPTION OF THE DRAWINGS

Various embodiments of the disclosure are illustrated in the drawings, in which:

FIG. 17 illustrates an example table of relationships among cards dealt to a player side and a banker side, motions to be performed on cards, and branching timings.

DETAILED DESCRIPTION

Figure 1:
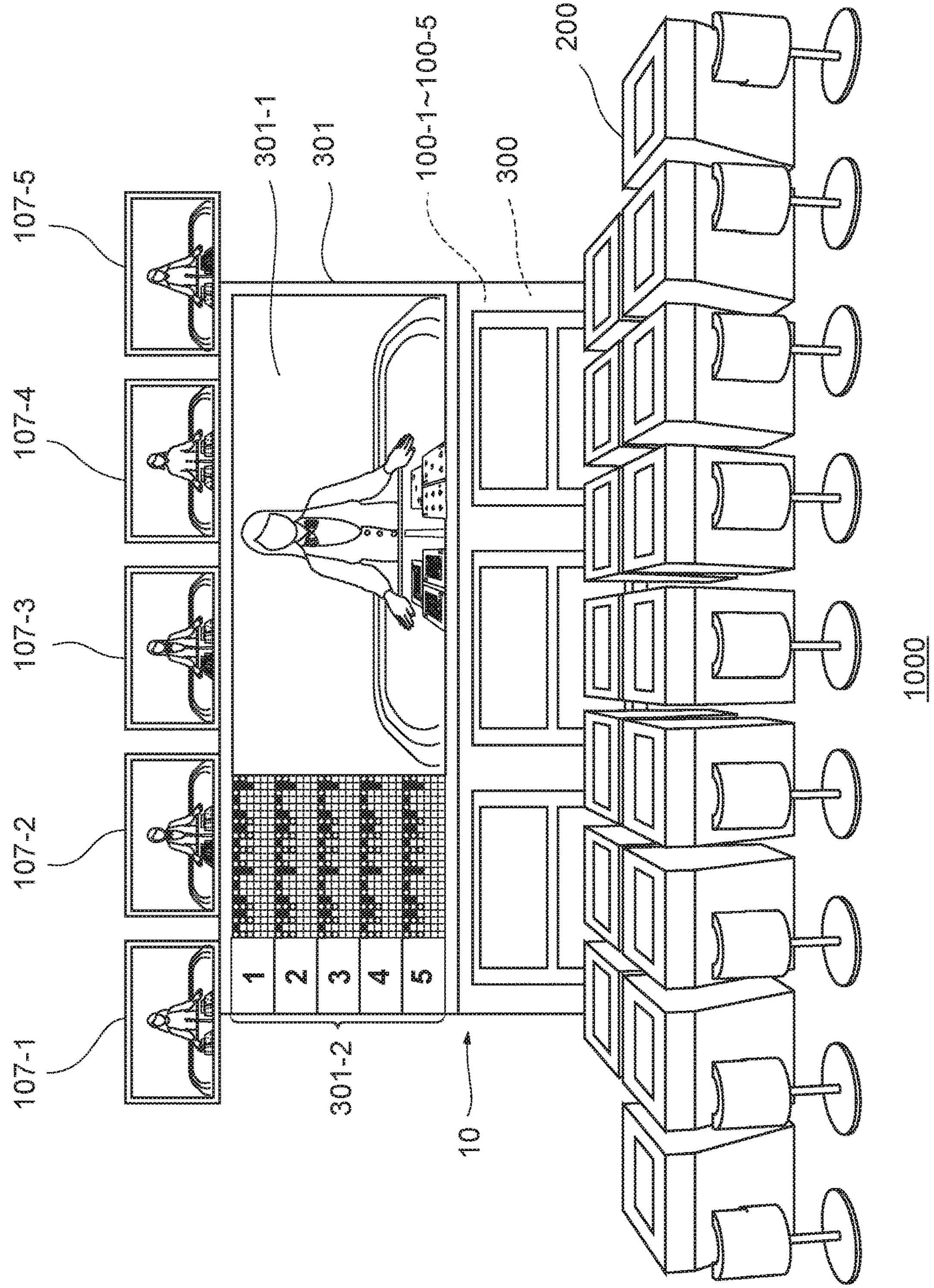
FIG. 1 is an external configuration diagram of a card game system according to embodiments.

Embodiments of the present disclosure will be described below in detail. The embodiments below are examples for describing the present disclosure and are not intended to limit the present disclosure only to the embodiments. Further, various modifications of the present disclosure are possible unless the modifications depart from the spirit of the present disclosure. Furthermore, those skilled in the art could adopt an embodiment in which each component described below is replaced with an equivalent, and such an embodiment is also included in the scope of the present disclosure. Furthermore, it is assumed that positional relationships such as up, down, left and right shown as necessary are based on the shown display of each figure unless otherwise stated. Furthermore, various dimension ratios in the diagrams are not limited to the shown ratios.

In a first embodiment below, a card game system configured to realize baccarat, one of the representative card games, as a game will be illustrated. However, the kind of a card game as a target to which the present disclosure is applied is not limited. The present disclosure is applicable to other kinds of card games.

0. Definition

In the present specification, terms will be defined as below.

"Card": a "card" refers to a piece of paper that can be held by a hand. The material does not matter. The "card" refers to such that is intended to be used for playing cards. In Japan, what is called a "trump card" is included. In the present embodiment, a surface on which a score (1 to 10, J, Q, K) is recorded will be referred to as a "front surface", and a surface on which a common picture (a pattern, a color and the like) is given will be referred to as a "back surface". Though the shape of the card is not limited, the card is such that, as an end part is gradually opened from a state of being laid down with the back surface exposed, a part of a score recorded on the front surface comes to be seen according to particular rules.

"Suit": a "suit" is a mark (a stamp) recorded on the front surface of a card. For example, in French type (British-American type) cards described in the present embodiment, there are four kinds of suits: spade, heart, diamond and club. Scores for one suit to ten suits and scores for pictures of 11 to 13 are specified.

"Squeeze motion": a "squeeze motion" refers to a motion of, from a state in which a card is laid down with the back surface exposed, opening the end part of the card by bending the card, while hiding a number at the end of the card (in a real game, a user hides the number with a finger, while, in the present embodiment, an image is generated in a manner that the number is not displayed), so that a part of the score on the front surface can be visually confirmed. When the card is rectangular, there are "oblique squeeze" of opening the card from a corner part, "vertical squeeze" of opening the card from a short side and "horizontal squeeze" of opening the card from a long side. A moving image expressing the "squeeze motion" is referred to as a "squeeze image".

"Turn-over motion": a "turn-over motion" refers to a motion of, without performing a squeeze motion, turning over a card at a high speed so that the whole score on the front surface of the card is seen. The case of performing a "squeeze motion" at first and then turning over the card at a high speed is also referred to as the "turn-over motion".

"Card opening motion": a "card opening motion" is to perform a "squeeze motion" or a "turn-over motion" or perform a "turn-over motion" after a "squeeze motion", and refers to a motion of showing the score on the front surface of a card.

"Score": a "score" is a numerical value indicated by the number of suits or a frame recorded on the front surface of a card. In the French type (British-American type) cards, scores A (=1) and 2 to 10 are recorded according to the number of suits, and scores "J" (=11), "Q" (=12) and "K" (=13) are recorded according to kinds of pictures.

"Final score": a "final score" refers to a score decided by the number of all suits or a picture recorded on the front surface when the score is compared with a "predicted score" below.

"Predicted score": a "predicted score" refers to a score that is predicted when a part of suit(s) recorded on the front surface gradually appears by a "squeeze motion". There may be a case where there is one "predicted score" or a case where there are a plurality of "predicted scores". For example, if a suit is (or suits are) not seen even when squeeze is performed to some extent, it is predicted that the suit is recorded at the center of a card, and, therefore, the "predicted score" is A (=1). The "predicted score" is variously specified according to the kind of a squeeze motion and how a suit is (or suits are) seen.

"Target score": a "target score" refers to a score to be acquired in order to win a card game.

"Branching timing": a "branching timing" is a timing to decide whether to discontinue a "squeeze motion" or to change the speed of the "squeeze motion" according to a predicted score seen at a middle stage of the "squeeze motion".

"Card game": a "card game" is a generic name of games using cards. The kind of game is not limited. The "card game" refers to such a game that win, loss, draw and the like are decided on the basis of scores recorded on the front surfaces of cards. Games played in casinos and Japanese traditional games such as karuta cards are also included.

"Baccarat": "Baccarat" is a traditional card game illustrated in the present embodiment, and it refers to a game in which a user predicts win/loss of a card game between a banker (a role of a bookmaker) and a player (a role of a guest) and places a bet. The user merely predicts win/loss of a game, and baccarat is popular in casinos all over the world because of its easiness and the like. A dealer deals two or three trump cards to each of the banker and the player according to certain rules. One who has cards the first digit of the total number of which is closer to "9" becomes a winner.

"Bet": to "bet" refers to declaring a user's prediction. Specifically, to bet refers to predicting whether a banker will win, a player will win or a game will end in a draw (a tie) and placing a bet according to the win/loss prediction.

"Table": a "table" is a virtual table which is a reproduction of a card table used for a dealer to handle cards in an actual casino. In the present embodiment, five tables are prepared.

"Moving image": a "moving image" refers to a series of frame images that show a subject as if the subject were moving by being continuously displayed for each predetermined synchronization period. As a recording format of the moving image, what is compressed and encoded with a moving image standard such as MPEG (Moving Picture Experts Group) is also included. In the present specification, the "moving image" means both of the series of frame image groups and data obtained by compressing and encoding the series of frame image groups themselves, and a moving image itself displayed by reproducing the data.

First Embodiment

The present first embodiment relates to a card game apparatus in which the present disclosure is applied to "oblique squeeze" of turning over a card dealt on a table from a corner part.

1. System Configuration

FIG. 1 shows a schematic external configuration diagram of the card game system according to the present embodiment. As shown in FIG. 1, a card game system 1000 is configured being provided with a body 10 in which a large-size main display 301 is arranged at the center, and a plurality of stations 200.

On the top of the body 10, five sub displays 107-1 to 107-5 are arranged. Inside the body 10, a main controller 300 and five sub controllers 100-1 to 100-5 are arranged though they are not shown. The main display 301 is display means for displaying an image generated by the main controller 300 and is divided in a dealer display area 301-1 and an all tables' history display area 301-2. An image displayed in the dealer display area 301-1 is the same as an image of any of the sub displays 107-1 to 107-5. In FIG. 1, the same image as an image displayed on the sub display 107-3 is enlargedly displayed in the dealer display area 301-1 of the main display 301.

The plurality of stations 200 are terminal apparatuses for users to sit down at to participate in a card game, which are arranged in front of the body 10. A touch panel equipped display is placed on each of the plurality of stations 200.

Figure 2:
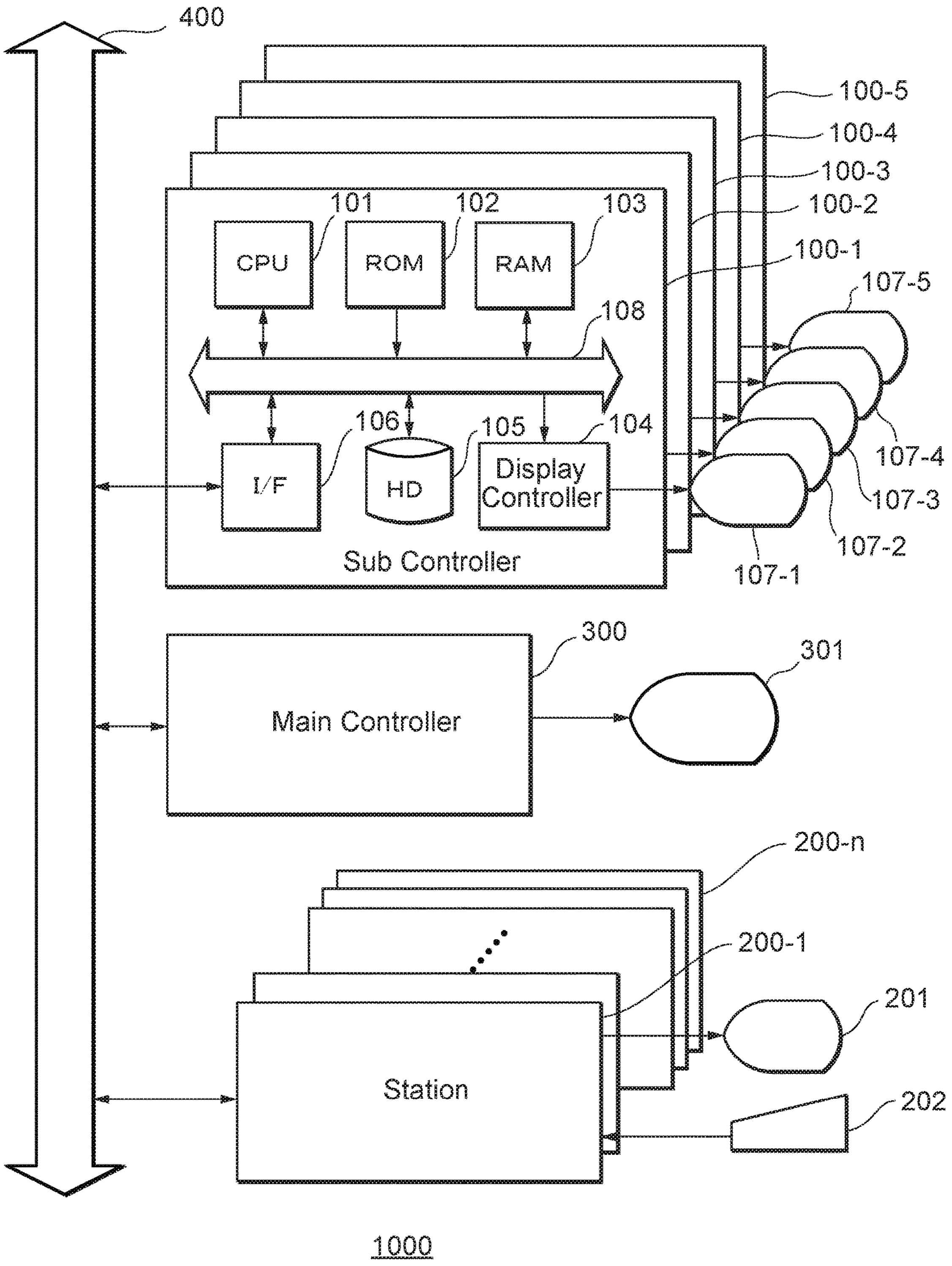
FIG. 2 is a system configuration diagram of the card game system according to the embodiments.

FIG. 2 shows a system block diagram of the card game system according to the present embodiment. As shown in FIG. 2, the card game system 1000 is configured by the plurality of sub controllers 100-1 to 100-5, the plurality of stations 200-*n* (n is a natural number equal to or larger than 2) and the main controller 300 being mutually connected via a network 400.

Each of the sub controllers 100-1 to 100-5 corresponds to the card game apparatus according to the present disclosure and is provided with a configuration as a computer apparatus. The sub controllers 100-1 to 100-5 are configured to be capable of mutually independently executing a card game. Hereinafter, when description common to all of the five sub controllers 100-1 to 100-5 is made, the sub controllers 100-1 to 100-5 will be referred to as a "sub controller 100". Specifically, the sub controller 100 is configured being provided with a CPU (Central Processing Unit) 101, a ROM (Read Only Memory) 102, a RAM (Random Access Memory) 103, a display controller 104, a hard disk 105 and an interface device 106. The sub displays 107-1 to 107-5 are connected to the display controllers 104 of the sub controllers 100-1 to 100-5, respectively (hereinafter, when common description is made, the sub displays 107-1 to 107-5 will be referred to as a "sub display 107). An initial program loader and the like for starting up the system are stored in the ROM 102. The RAM 103 is memory means to be used as a temporary storage area by the CPU 101. The display controller 104 is provided with a frame memory not shown and is adapted to be capable of, by control of the CPU 101, generating image data at each predetermined update timing, storing the image data into the frame memory and outputting the image data to the sub display 107. A card game software program according to the present disclosure is stored in the hard disk 105. The interface device 106 is adapted to execute transmission/reception of data to/from the main controller 300 and the stations 200-*n* via the network 400.

In each sub controller 100, the CPU 101 executes the initial program loader stored in the ROM 102, appropriately transfers the card game software program and a control software program according to the present disclosure to the RAM 103 and executes the programs to cause the sub controller 100 to function as the card game apparatus of the present disclosure. On the sub display 107 connected to each sub controller 100, a game image generated for a card game executed on the sub controller 100 is displayed. The game image generated for each card game is configured with a background image that is a two-dimensional image, a dealer that is a moving image and pseudo-stereoscopic images such as a table and cards.

Each of the plurality of stations 200-*n* has a configuration as a computer apparatus similar to the sub controller 100 though it is not shown (hereinafter, when common description is made, the stations 200-*n* will be referred to as a "station 200"). The station 200 is provided with a touch panel equipped display 201 and an operation portion 202. The touch panel equipped display 201 is capable of displaying a progress state of a card game in any sub controller 100 selected by a user in each station 200. The operation portion 202 is input means for reflecting a user operation to the card game system 1000, and operations of a touch panel and operations of an operation button not shown are included. When the user selects any sub controller 100 by operating the operation portion 202, a game image generated for a card game executed by the selected sub controller 100 is displayed on the display 201. Hereinafter, selecting any sub controller 100 will be simply expressed as "selecting a card game".

Each main controller 300 has a configuration as a computer apparatus similar to the sub-controller 100 though it is not shown. In order to manage overall progress of card games, the main controller 300 is configured to be capable of instructing all the sub controllers 100 to start betting and end the betting, start deal and end the deal, and start dividend payment and end the dividend payment. The main controller 300 is configured to be capable of fully monitoring a progress state of a card game executed in each sub controller 100. The main controller 300 is adapted to display a game image generated for a card game executed on any sub controller 100 in the dealer display area 301-1 of the main display 301. Further, the main controller 300 stores past win/loss results of card games in each sub controller 100 and is configured to be capable of charting the past win/loss result and displaying the chart in the all tables' history display area 301-2 of the main display 301.

The network 400 is a communication network mutually connecting the sub controller 100, the station 200 and the main controller 300. The network 400 is a communication network such as a LAN (Local Area Network) for wired and/or wireless mutual connection, WAN (Wide Area Network) and the Internet as non-limiting examples.

2. Flow of Card Game

Figure 3:
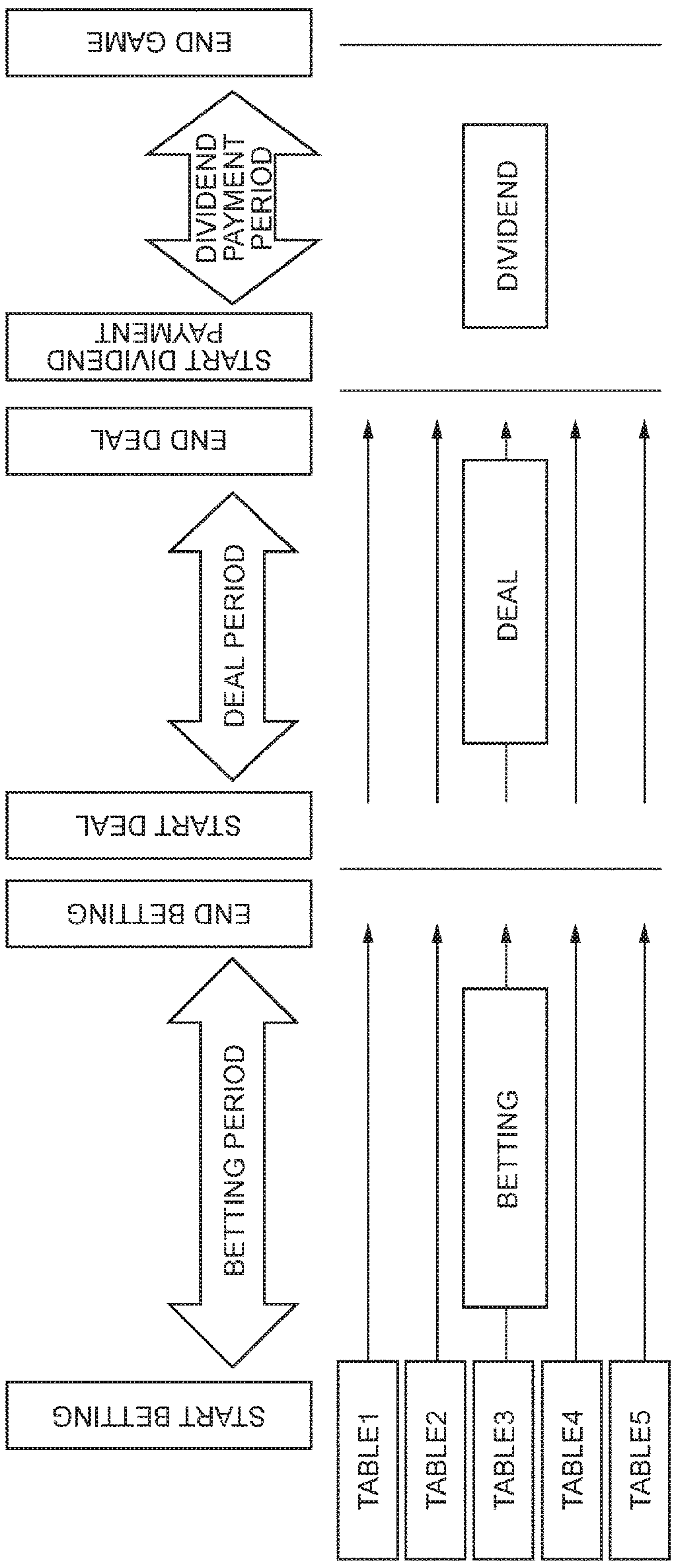
FIG. 3 is a flowchart of a card game according to the embodiments.

FIG. 3 shows a flowchart of a card game performed in the card game system 1000. As shown in FIG. 3, the present card game is roughly divided in a "betting period", a "deal period" and a "dividend payment period", and, thereby, a one-round card game is configured. Start and end timings of these periods are managed by the main controller 300, and the main controller 300 instructs each sub controller 100 to start and end the periods. For example, the betting period, the deal period and the dividend payment period are respectively set to 25 seconds, 15 seconds, and 5 seconds.

As one of characteristics of the card game system 1000 according to the present embodiment, it is given that the plurality of sub controllers 100 cause a plurality of card games to simultaneously progress. By causing the plurality of card games to simultaneously progress on the plurality of virtual tables, it is possible to provide amusement that could not be enjoyed in a conventional card game.

Specifically, the user who sits down at any station 200 selects any one of the plurality of virtual tables, and places a bet, predicting win/loss at the table.

Betting Period

The "betting period" is a period for the user to predict win/loss and place a bet before dealing cards. The user who participates in the card game sits down at an empty station 200. Then, during the betting period, the user predicts win/loss of any one or more of card games among five card games caused to simultaneously progress, and operates the operation portion 202 of each station 200 to bet a chip corresponding to a bet amount according to the win/loss prediction. The user can select and display an image of a card game executed in any of the sub controllers 100-1 to 100-5 by operating the operation portion 202.

During the betting period, a moving image of a dealer assigned to each card game is displayed on each sub display 107 of the body 10. Further, a game image generated for a card game executed on any sub controller 100 is displayed in the dealer display area 301-1 of the main display 301 of the body 10.

Deal Period

The "deal period" is a period during which, after elapse of the betting period, the user is prohibited from placing a bet, and cards are dealt to cause a card game to progress in each sub controller 100. In the card game, two or three cards are dealt to each of the banker side and the player side. Whether two cards or three cards are dealt to each side is decided by each sub controller 100 according to rules in each round. Then, the number of cards is determined to satisfy the decided number of cards to be dealt.

Especially, in the present embodiment, the "squeeze motion" according to the present disclosure is executed during the deal period. The sub controller 100 manages a card game played on any of the virtual tables, so that cards are dealt on the table during the deal period, and a squeeze image, that is, an image of sequentially turning over the cards is generated. At that time, the sub controller 100 appropriately judges whether a "squeeze motion" is to be executed or not, which kind of "squeeze motion" is to be selected, and at which branching timing the "squeeze motion" is to be discontinued, according to conditions to be described later and generates a corresponding card image.

To briefly explain this, any of squeeze selection tables specifying kinds of "squeeze motions" according to whether or not a bet is placed on any of the banker side and the player side during the betting period is selected. Then, for each card, one "squeeze motion" identified according to a progress state of a card game is executed. Then, at a predetermined branching timing at which it is judged that there is no profit in further continuing the "squeeze motion", the "squeeze motion" is discontinued. By appropriately discontinuing the "squeeze motion" within a limited time of 15 seconds in total of the deal period, a motion of turning over all the cards is caused to end within the limited time irrespective of a user operation, so that efficient game operation is enabled.

Dividend Payment Period

The "dividend payment period" is a period during which payment is performed with a dividend corresponding to the user's betting state and scores of the banker side and the player side after elapse of the deal period. When win/loss of each card game is decided during the deal period, a dividend in a main bet is decided. Further, if the user has placed a side bet, a dividend in the side bet is also decided. Then, payment on each station 200 is performed according to the decided dividend, and one round (one game) of the card game ends.

3. Configuration of Sub Controller 100

Figure 4:
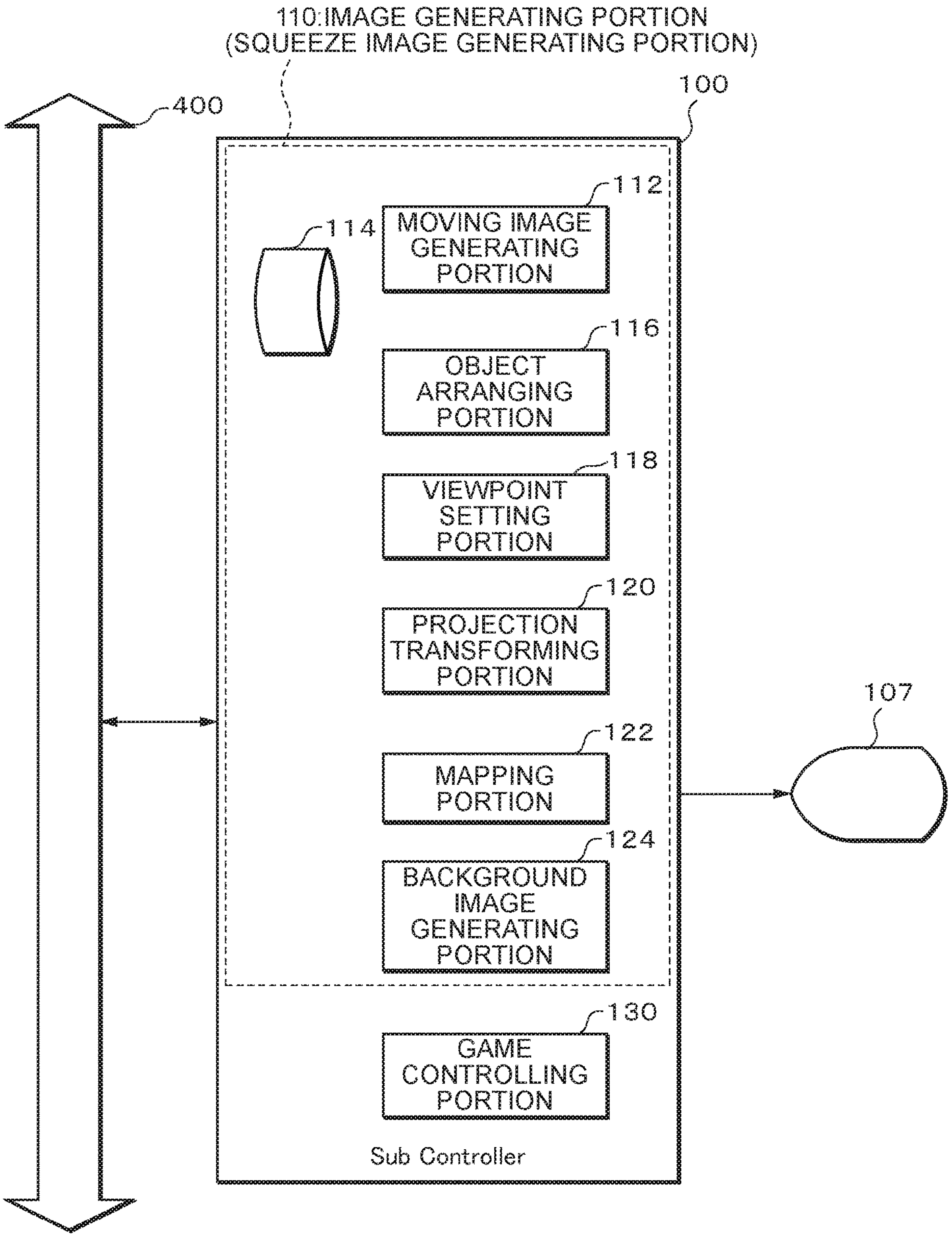
FIG. 4 is a block diagram of a sub controller (a card game apparatus) according to the embodiments.

FIG. 4 shows a block diagram of the sub controller (the card game apparatus). Each functional block shown in FIG. 4 is functionally realized by the CPU 101 of the sub controller 100 executing the card game software program according to the present disclosure. An expression and separation of each functional block are provided for convenience of description, and expressions and separations other than those illustrated here are also possible. For example, a plurality of functional blocks may be integrated into one, or one functional block may be divided into a plurality blocks.

As shown in FIG. 4, the sub controller 100 can functionally realize an image generating portion 110 and a game controlling portion 130 by the CPU 101 executing the card game software program. The image generating portion 110 corresponds to a "squeeze image generating portion" according to the present disclosure.

The image generating portion 110 generates a game image obtained by generating and combining background images constituting a baccarat game, object images such as a baccarat table and cards, and a moving image expressing a dealer, and is especially configured to be capable of generating a squeeze image showing a squeeze motion of a card being turned over from an end, from the back surface to the front surface. Specifically, the image generating portion 110 is functionally provided with a moving image generating portion 112, an object arranging portion 116, a viewpoint setting portion 118, a projection transforming portion 120, a mapping portion 122 and a background image generating portion 124. The ROM 102, the RAM 103 and the hard disk 105 constitute an image storing portion 114.

The image storing portion 114 is a storage area that stores therein animation data used for generation of a moving image (a dealer) and image data of objects (a table, cards and other fixtures) used for generation of pseudo-stereoscopic images. The moving image generating portion 112 reads out the animation data from the image storing portion 114 and generates a moving image for causing a dealer to be displayed. The viewpoint setting portion 118 sets a viewpoint in virtual three-dimensional space. The object arranging portion 116 reads out image data of objects included in a view volume set with the viewpoint as a center from the image storing portion 114 and arranges the image data in a world coordinate system. The projection transforming portion 120 performs perspective projection transformation of the objects to a viewpoint coordinate system with the viewpoint as a reference. The mapping portion 122 maps texture corresponding to the perspective projection transformed objects. The background image generating portion 124 generates a background image. Then, the background image, the mapped object images and the moving image of a dealer are combined to be a two-dimensional surface and outputted for each frame period. The composite image is displayed on the main display 301, the sub displays 107-1 to 107-5 and the display 201 of each station 200 in FIG. 1.

The game controlling portion 130 is a functional block that controls progress of a card game on the basis of a final score displayed on the front surface of a card during the deal period. Specifically, the game controlling portion 130 operates so as to discontinue a squeeze motion according to predetermined conditions at a branching timing at which a number of a predicted score that is predicted by a part of a suit (or suits) appearing according to progress of the squeeze motion on the card changes. Specific description will be made later.

3-1. Generation of Squeeze Image

Next, the "squeeze motion" on a card according to the present disclosure will be described. A squeeze image expressing the "squeeze motion" is generated on the basis of image data of an object of a card. Specifically, each card is one object and is configured with a plurality of polygons. The number of polygons may be a number making it possible to naturally visually confirm that the card is turned over as the "squeeze motion" and forms a curved surface. To polygons constituting the back surface of the card, texture for the back surface is mapped. To polygons constituting the front surface of the card, texture that causes a suit (or suits) corresponding to a score to be displayed for each card is mapped. The score of each card is decided at least immediately before starting deal.

In order to generate a squeeze image of a card, the image generating portion 110 arranges polygons at an end (a corner part, a short side or a long side) of the card set in advance on such spatial coordinates that the card constitutes a curved surface, and changes the spatial coordinates according to speed of a "squeeze motion". At the time of discontinuing the "squeeze motion", the arrangement of the polygons is changed so that an image of such a "turn-over motion" that the card is turned over at once from the back surface to the front surface is obtained. Thereby, an image of the "squeeze motion" being discontinued and the card being quickly turned over to the front surface is expressed.

3-2. Decision of Whether Squeeze Motion is to be Performed or Not

In the present embodiment, the game controlling portion 130 is adapted to decide whether a squeeze motion is to be performed or not, according to a progress state of a card game. Hereinafter, description will be made on deciding whether a squeeze motion is to be performed or not.

Figure 5A:
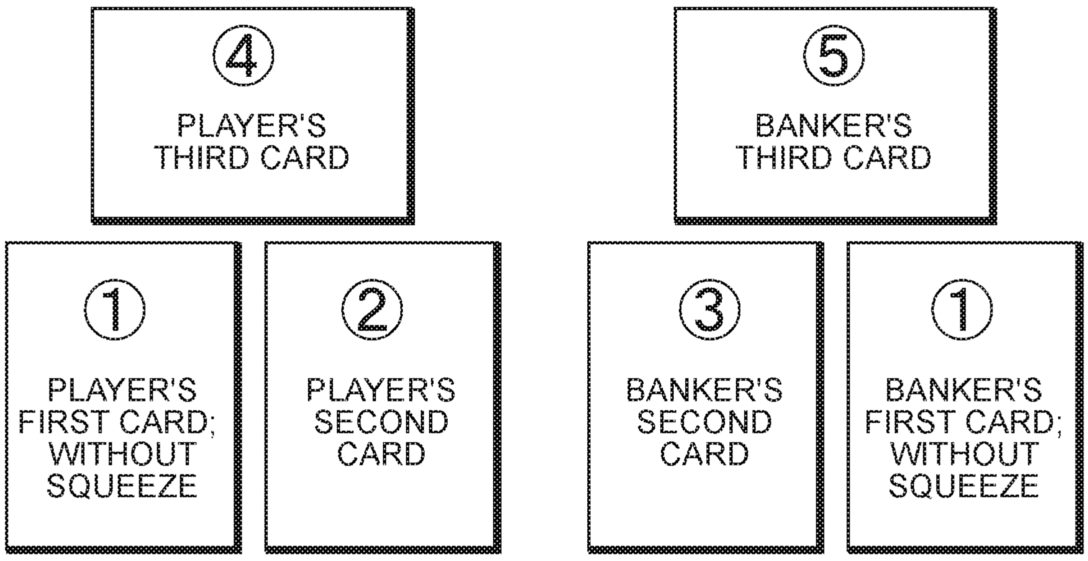
FIG. 5A is a diagram of order of dealing cards and whether a squeeze motion is to be performed or not in baccarat.

FIG. 5A shows order of dealing cards and whether a squeeze motion is to be performed or not in baccarat. As shown in FIG. 5A, in baccarat, two or three cards are dealt to each of the player side and the banker side, that is, up to six cards in total are dealt. Whether the second and subsequent cards are to be dealt to each of the player side and the banker side is decided by the score of the first card dealt to the player side and the banker side. It does not happen that win/loss is decided by the first card. Win/loss is decided by the second or third cards dealt to the player side and the banker side.

Therefore, as for the first card that does not immediately decide an outcome of a game, turning over the card itself does not make the user who has placed a bet on any side feel tension. Further, since the deal period is a limited short period, it is inappropriate to spend useless time on such staging that does not appeal to the user.

Therefore, as shown in FIG. 5A, as for each of the first cards dealt to the player side and the banker side, the game controlling portion 130 displays a pseudo-stereoscopic image of a "turn-over motion" of quickly turning over the card from the back surface to the front surface without performing staging of a "squeeze motion" in the present embodiment. FIG. 5A shows it. As for the second and third cards, since there is a possibility that the cards decide win/loss and tension is given to the user, the game controlling portion 130 executes staging by a "squeeze motion".

Figure 5B:
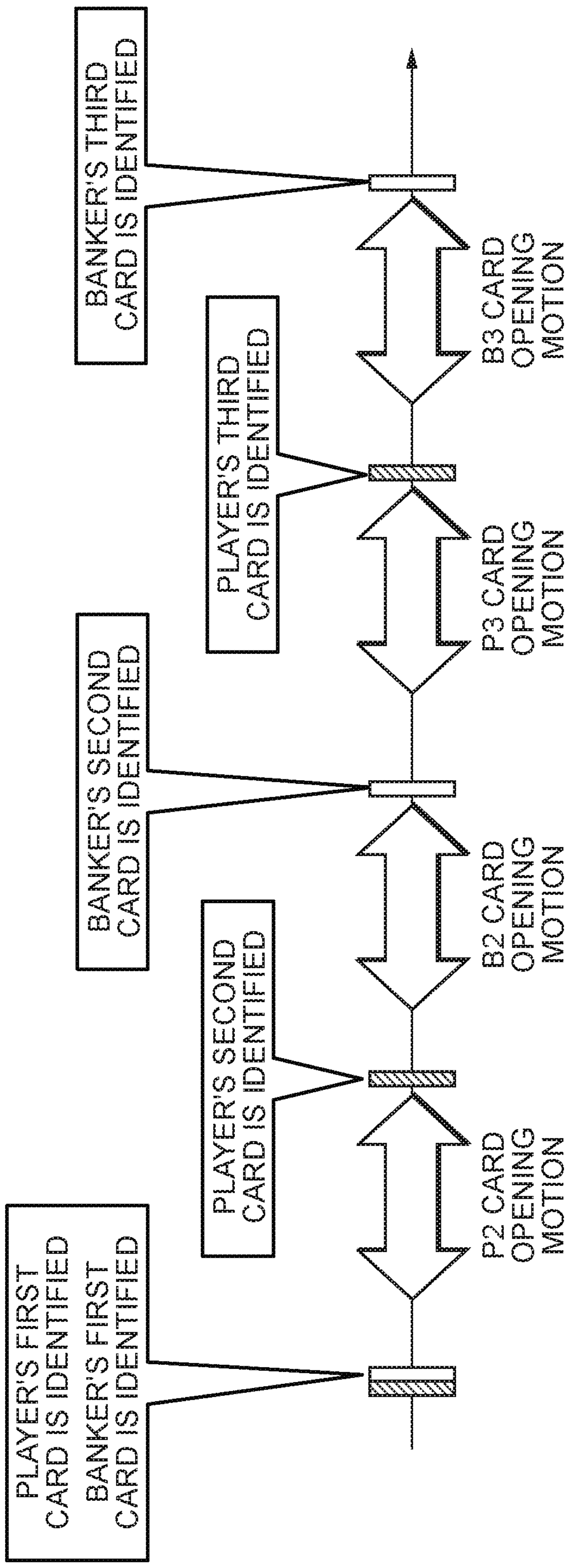
FIG. 5B is a sequence diagram of card opening motions in one game.

FIG. 5B shows a sequence of squeeze motions in the case of dealing three cards to each of a player and a banker in one game and shows whether the staging by a "squeeze motion" described above is to be performed or not in time series. As shown in FIG. 5B, as for a motion of turning over the first card on the player side, and a card opening motion of the first card on the banker side, the staging by a "squeeze motion" is not performed. After that, the second card on the player side is dealt, a card opening motion comprising a "squeeze motion" is performed, and a score is identified. Next, the second card on the banker side is dealt. A card opening motion comprising a "squeeze motion" is performed, and a score is identified.

Furthermore, after that, the third card on the player side is dealt, and, in principle, a "squeeze motion" is performed. However, according to whether the score is high or low, a "turn-over motion" without a "squeeze motion" is performed. As for the third card on the banker side, since a case where the trend of win/loss is decided by the score of the card occurs less frequently, a case where the "turn-over motion" is performed instead of the "squeeze motion" occurs relatively frequently in comparison with the third card on the player side.

In Specification of U.S. Pat. No. 7,758,425, a state of contact of a finger with which a user slides on a touch panel while viewing a displayed virtual card is detected, and the detection is reflected on a squeeze image. In this respect, since it is necessary to cause five card games to concurrently progress in parallel in the present embodiment, start and end timings of the deal period are strictly managed. If "squeeze motions" on cards are entrusted to user operations, there is a strong possibility that progress of the card games is delayed. Further, in the card game system 1000 according to the present embodiment, there is a strong possibility that a plurality of users who place a bet on one card game exist, and it is difficult to judge which user operation is to be reflected on a "squeeze motion".

Therefore, in the present embodiment, it is assumed that, instead of a "squeeze motion" by a user operation, whether a "squeeze motion" is to be done or not, speed of the "squeeze motion", whether the "squeeze motion" is to be discontinued or not, and the like are determined by the sub controller 100 under the idea that strict execution and schedule management by a computer is appropriate. However, a squeeze image showing that a "squeeze motion" is performed in response to a user operation may be generated if it is permitted from a viewpoint of management.

Figure 6:
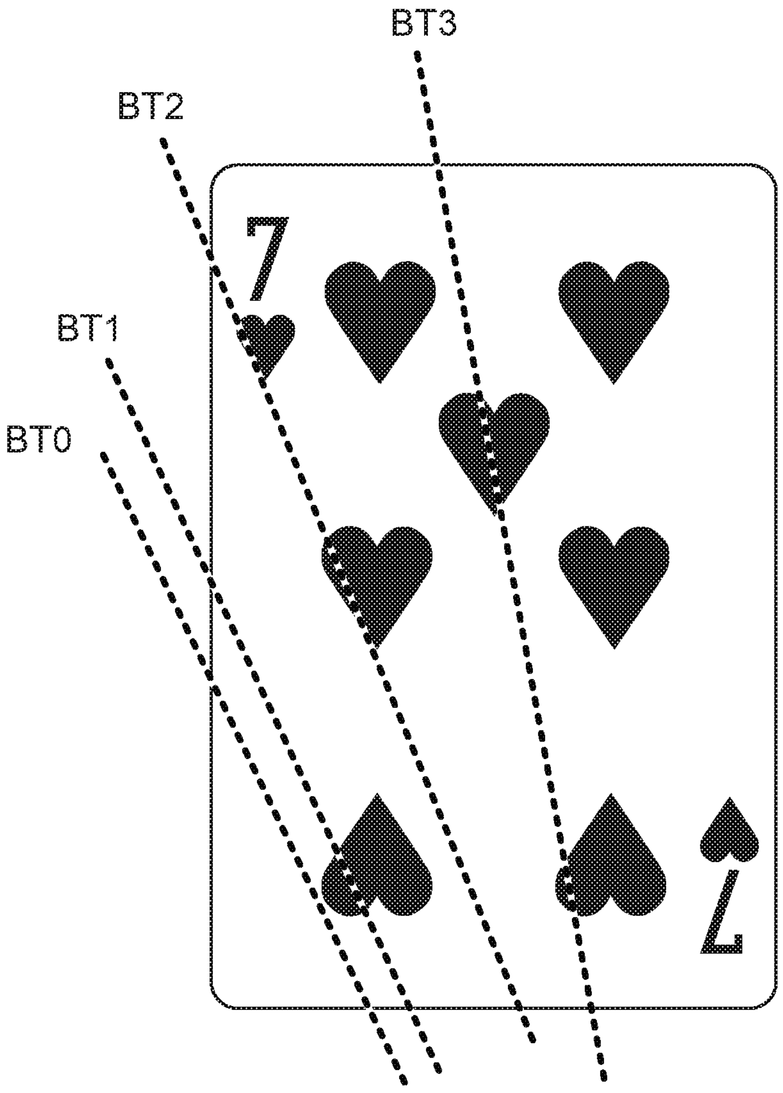
FIG. 6 shows an example of setting branching timings at the time of performing the squeeze motion from a corner part of a card, according to a first embodiment.

3-3. Predicted Score That Changes According to Degree of Progress of Squeeze Motion FIG. 6 shows an example of setting of branching timings at the time of performing a squeeze motion (oblique squeeze) from a corner part of a card. The case of performing a squeeze motion (horizontal squeeze) from a short side of a card will be described in a second embodiment, and the case of performing a squeeze motion (horizontal squeeze) from a long side of a card will be described in a third embodiment. In FIG. 6, the front surface of a card having seven heart suits in total, that is, a card of "7 of hearts" is shown as an example.

In the present first embodiment, it is assumed that a "squeeze motion" is performed from a corner part at a lower left corner when seen from the front surface side of a card (a corner part at a lower right corner when seen from the back surface side of the card). In the present first embodiment, four branching timings shown by lines BT0 to BT3 are set as shown in FIG. 6. The branching timings corresponding to the lines BT0 to BT3 are referred to as branching timings 0 to 3, respectively. By the card being turned over, a squeeze image in which an area on the lower left side of the line BT0 is seen is displayed at the branching timing 0. At the branching timing 1, a squeeze image in which an area on the lower left side of the line BT1 is seen is displayed. At the branching timing 2, a squeeze image in which an area on the lower left side of the line BT2 is seen is displayed. At the branching timing 3, a squeeze image in which an area on the lower left side of the line BT3 is seen is displayed.

Figure 7:
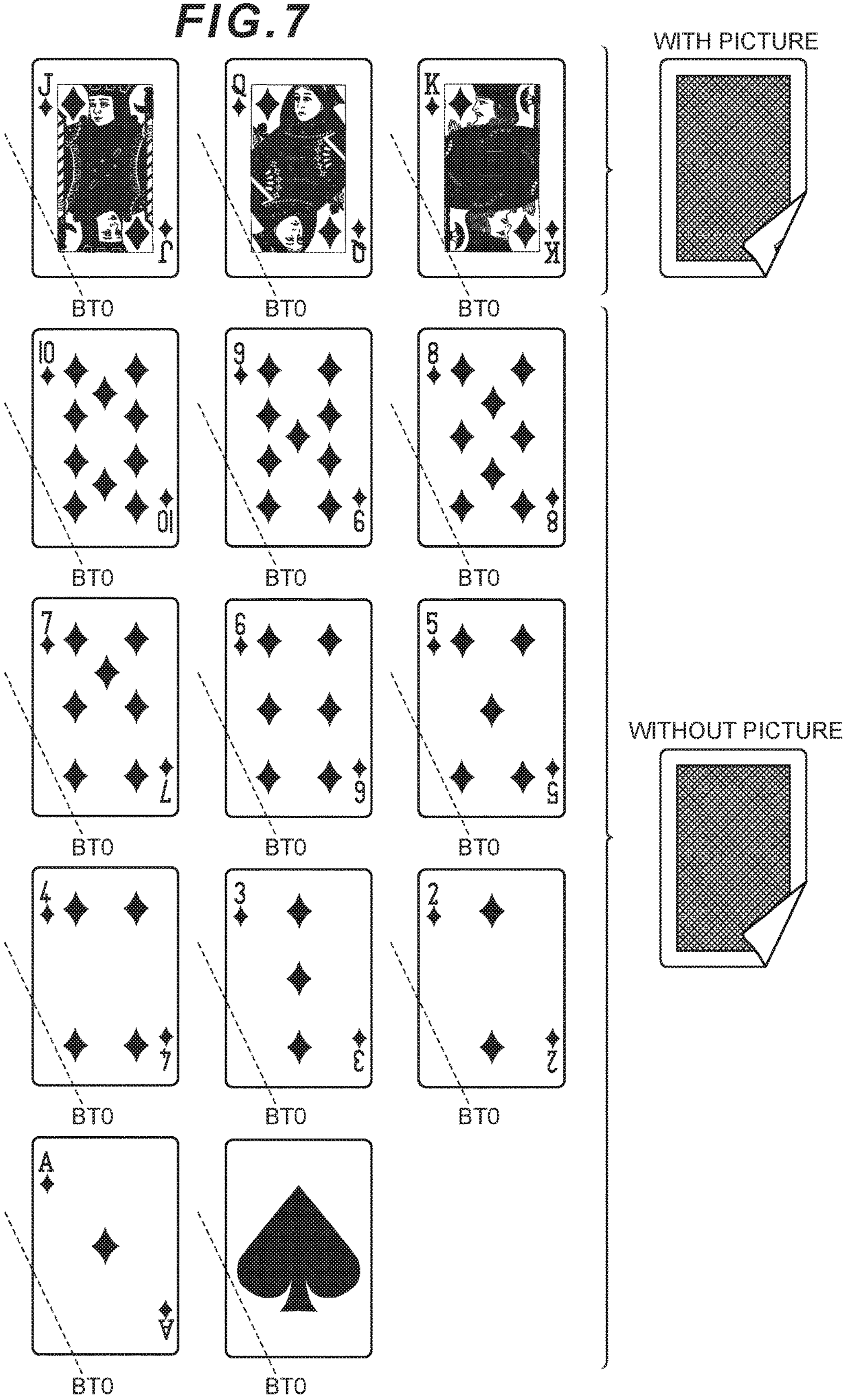
FIG. 7 shows an example of a squeeze image of each card at card branching timing 0 according to the first embodiment.

FIG. 7 shows an example of a squeeze image of each card at the branching timing 0. As shown in FIG. 7, as for "J" (Jack), "Q" (Queen) and "K" (King) cards, a picture is recorded up to vicinities of end parts of each card. On the other hand, as for cards with scores of 1 to 10, a suit is (or suits are) recorded inside the outline of the picture. Therefore, when a "squeeze motion" is performed from a corner part of a card up to the position of the line BT0, a part of a picture is seen first in the case of the picture cards, and nothing is seen in the case of the cards with scores of 1 to 10. Therefore, as shown in FIG. 7, if a picture is seen at the branching timing 0, which is a timing at which a "squeeze motion" has been performed up to the line BT0, the score of the card is "J", "Q" or "K", and it can be judged that the final score is zero. If nothing is seen, it can be judged that the card is any of the cards with scores of 1 to 10 without a picture. In this case, a predicted score is from 1 to 10.

Figure 8:
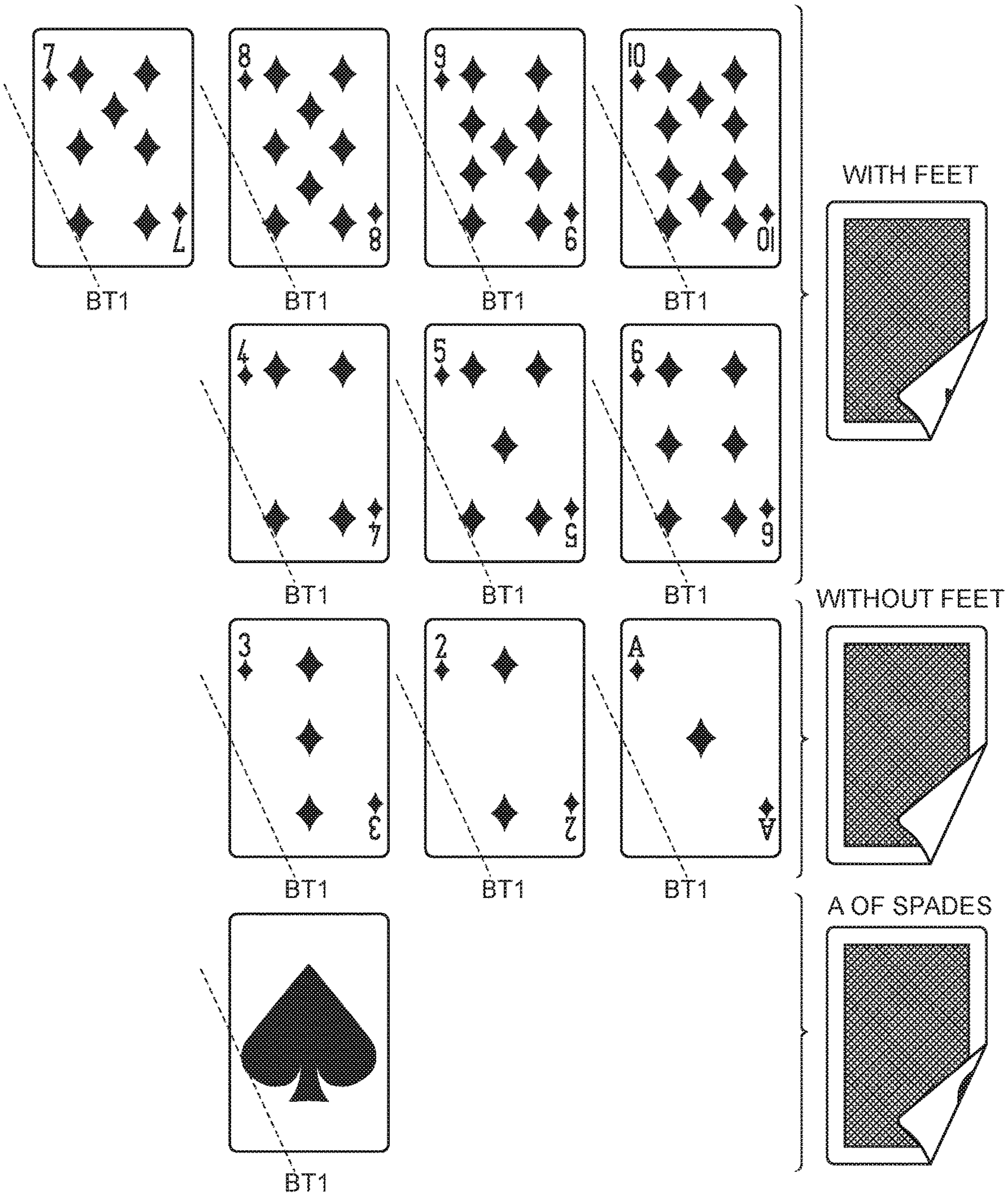
FIG. 8 shows an example of a squeeze image of each card at card branching timing 1 according to the first embodiment.

FIG. 8 shows an example of a squeeze image of each card at the branching timing 1. As shown in FIG. 8, as for each of the cards with scores of 4 to 10, two suits are recorded along a short side of the card ("with feet"). As for each of the cards with scores of 2 and 3, suits are recorded along a long side direction of the card at the middle of the card. As for each of the scores of aces (1) other than the ace of spades, a suit is recorded at the center of the card ("without feet"). As for the spade A card, a suit is recorded relatively large at the center of the card. Therefore, when a "squeeze motion" is caused to further progress from the line BT0 to the position of the line BT1, a part of suits is seen as being "with feet", as for the cards with scores of 4 to 10, and the cards with a score of ace (1) other than the ace of spade, 2 and 3 are identified to be "without feet". As for the card the score of which is the ace of spades, a part of the relatively large suit comes to be seen.

Therefore, as shown in FIG. 8, in the case of "with feet" at the branching timing 1 which is a timing at which the "squeeze motion" has been performed up to the line BT1, the score of the card is any of 4 to 10, and a predicted score can be judged to be from 4 to 10. In the case of “without feet”, the score is any of the aces other than the ace of spades, 2 and 3, and a predicted score can be judged to be from 1 to 3. If a part of the ace of spades is seen, the score is the ace of spades, and it can be judged that the final score is 1.

Figure 9:
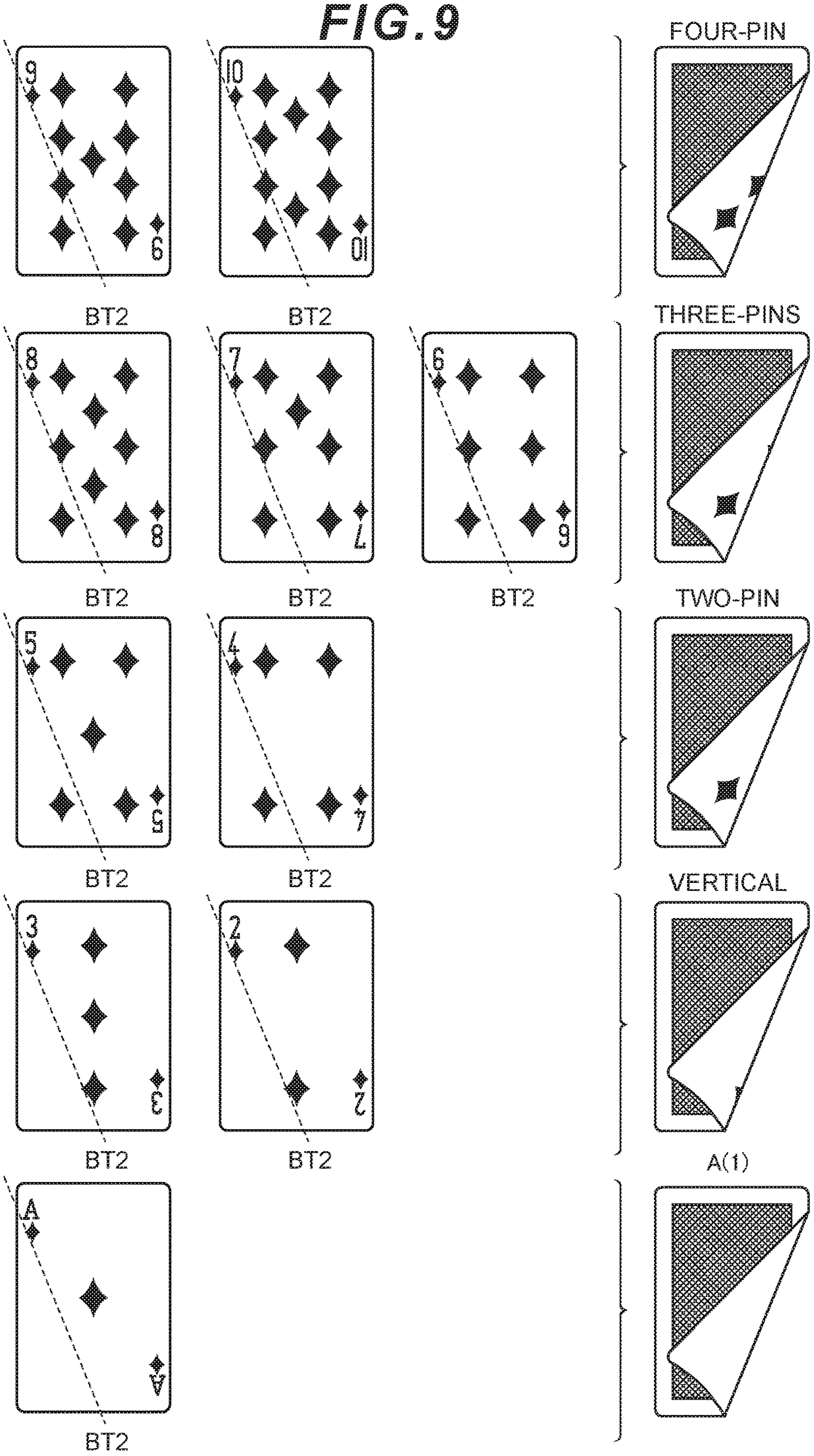
FIG. 9 shows an example of a squeeze image of each card at card branching timing 2 according to the first embodiment.

FIG. 9 shows an example of a squeeze image of each card at the branching timing 2. As shown in FIG. 9, as for a card with a score of 9 or 10, four suits arranged in line along a long side of the card are recorded (four-pin). As for each of the cards with scores of 6 to 8, three suits arranged in line along a long side of the card are recorded (three-pin). As for a card with a score of 4 or 5, two suits arranged in line along a long side of the card are recorded (two-pin). As for each of the cards the scores of which are aces other than the ace of spades, two or three suits are recorded at the middle of the card in parallel with a long side of the card (vertical). Therefore, when the “squeeze motion” is caused to further progress from the line BT1 to the position of the line BT2, lower two suits among “four-pin” suits come to be seen, as for the card with the score of 9 or 10, and the lowest suit and a part of the middle suit among “three-pin” suits come to be seen, as for the cards with scores of 6 to 8. Further, as for the card with the score of 4 or 5, a lower suit among a “two-pin” suit comes to be seen, and, as for the card with a score of 2 or 3, a part of a lower side suit among the “vertical” suits comes to be seen.

Therefore, as shown in FIG. 9, at the branching timing 2 which is a timing at which the “squeeze motion” has been performed up to the line BT2, it is identified, as for the “four-pin” suits, that the suits are “four-pin” from the distance between the two suits that are seen, and it can be judged that the score of the card is any of 9 and 10, and that a predicted score is 9 or 10. As for the “three-pin” suits, it is identified that the suits are “three-pin” from the lowest suit that is seen and the central suit a part of which is seen, and it can be judged that the score of the card is any of 6 to 8, and that a predicted score is from 6 to 8. As for “two-pin” suits, it is identified that the suits are “two-pin” from one suit on the lower side that is seen, and it can be judged that the score of the card is any of 4 and 5, and that a predicted score is 4 to 5. As for “vertical” suits, it is identified that the suits are “vertical” from a part of a suit that is seen in the middle, and it can be judged that the score of the card is any of 2 and 3, and that a predicted score is 2 or 3. Furthermore, if no suit is seen, it can be judged that the score is ace (1) and that the final score is 1.

Figure 10:
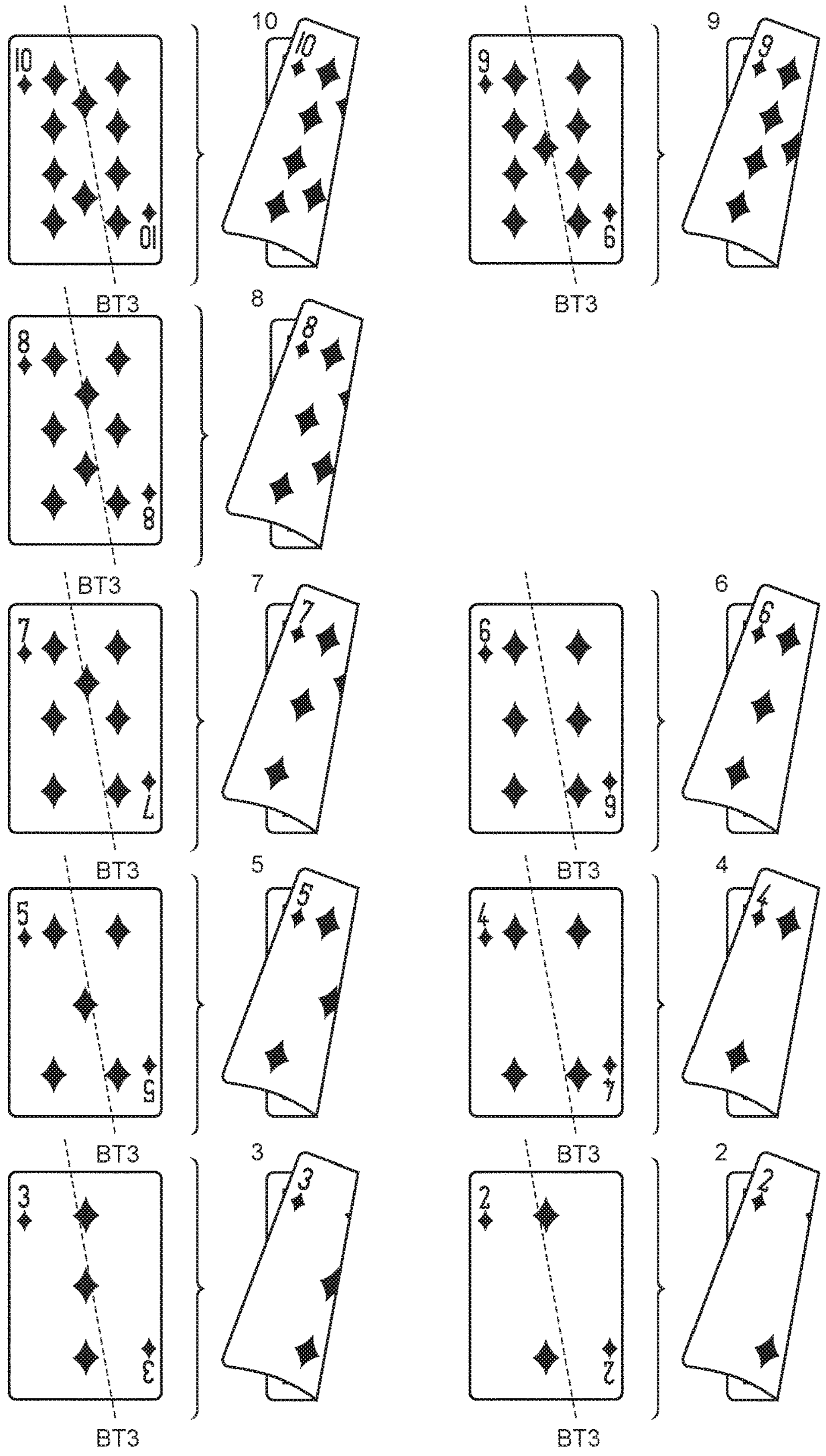
FIG. 10 shows an example of a squeeze image of each card at card branching timing 3 according to the first embodiment.

FIG. 10 shows an example of a squeeze image of each card at the branching timing 3. As shown in FIG. 10, when the “squeeze motion” is caused to further progress from the line BT2 to the position of the line BT3, how suits are seen is different for any of the cards with scores of 2 to 10. Therefore, as shown in FIG. 10, at the branching timing 3 which is a timing at which the “squeeze motion” has been performed up to the line BT3, corresponding one kind of card is decided for any of the cards with scores of 2 to 10. Therefore, the final scores can be judged to be 2 to 10.

3-4. Setting of Branching Timing

As described above, in the present first embodiment, timings of a “squeeze motion” corresponding to the lines BT0 to BT3 in FIG. 6 are set as the branching timings 0 to 3.

That is, in the present first embodiment, as branching timings to decide whether a “squeeze motion” is to be discontinued or speed of the “squeeze motion” is to be changed, according to a predicted score that comes to be seen at the middle stage of the “squeeze motion”, the game controlling portion 130 sets:

1) the branching timing 0 when existence/non-existence of a picture is identified;
2) the branching timing 1 when existence/non-existence of suits arranged in line along a short side of a card or the number of suits arranged in line along a short side of a card is identified;
3) the branching timing 2 when existence/non-existence of suits arranged in line along a long side of a card or the number of suits arranged in line along a long side is identified; and
4) the branching timing 3 when a score is decided.

Figure 11:
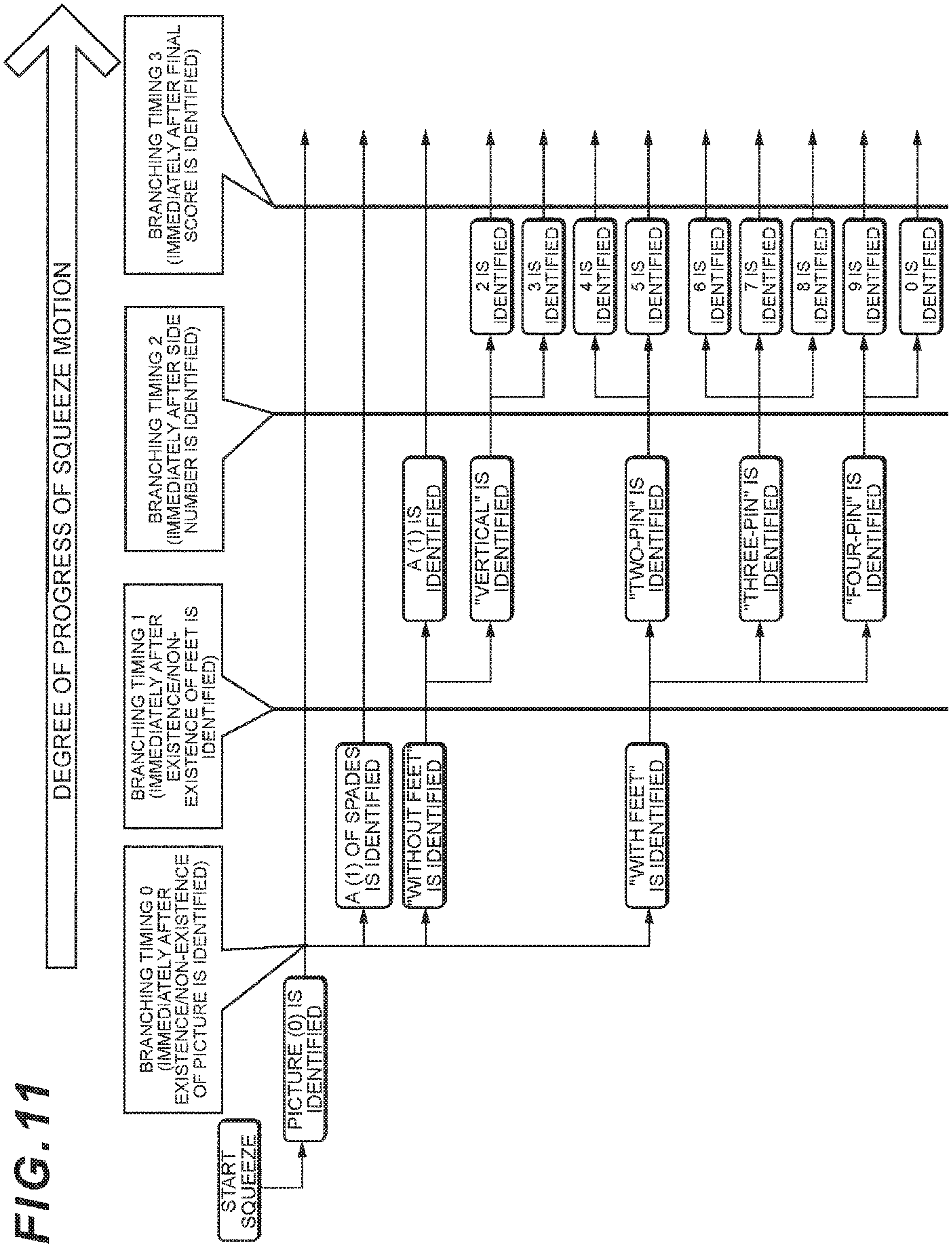
FIG. 11 shows a summary of branching timings that come as the squeeze motion progresses according to the first embodiment.

FIG. 11 collectively shows setting examples of branching timings for a card according to the present first embodiment described in FIGS. 6 to 10. As shown in FIG. 11, when a “squeeze motion” starts and progresses to the position of the line BT0, the branching timing 0 is reached, and it is identified whether a card has a picture or not. Next, when the “squeeze motion” progresses to the position of the line BT1, the branching timing 1 is reached, and it is identified whether the card has the suit of the ace of spades, a suit (suits) is in the “without feet” arrangement or suits are in the “with feet” arrangement. Next, when the “squeeze motion” progresses to the position of the line BT2, the branching timing 2 is reached, and it is identified whether the card has an ace other than the ace of spades or suits in the vertical arrangement, and it is identified whether suits arranged in line along a long side is in the two-pin arrangement, the three-pin arrangement or the four-pin arrangement. Furthermore, when the “squeeze motion” progresses to the position of the line BT3, the branching timing 3 is reached, and it is identified which of 2 to 10 the final score is.

Table 1 collectively shows relationships of predicted scores or final scores decided for the above branching timings, respectively, as a “squeeze motion” progresses.

TABLE 1

| Branching timing 0 | Branching timing 1 | Branching timing 2 | Branching timing 3 | Predicted score | Final score |
|---|---|---|---|---|---|
| Having picture is identified | | | | | 0 |
| Having no picture is identified | | | | 1-10 | |
| | A of spades is identified | | | | 1 |
| | “Without feet” is identified | | | 1, 2, 3 | |
| | | A is identified | | | 1 |
| | | “Vertical” is identified | | 2, 3 | |
| | | | 2 is identified | | 2 |
| | | | 3 is identified | | 3 |
| | “With feet” is identified | | | 4-10 | |
| | | “Two-pin” is identified | | 4, 5 | |
| | | | 4 is identified | | 4 |
| | | | 5 is identified | | 5 |

TABLE 1-continued

| Branching timing 0 | Branching timing 1 | Branching timing 2 | Branching timing 3 | Predicted score | Final score |
|---|---|---|---|---|---|
| | | "Three-pin" is identified | | 6, 7, 8 | |
| | | | 6 is identified | | |
| | | | 7 is identified | | |
| | | | 8 is identified | | |
| | | "Four-pin" is identified | | 9, 10 | |
| | | | 9 is identified | | 9 |
| | | | 10 is identified | | 10 |

3-5. Setting of Squeeze Selection Table

Next, a squeeze selection table will be described. In the present first embodiment, a plurality of kinds of "squeeze motions" are set according to conditions for discontinuing the "squeeze motion". The game controlling portion 130 is configured to hold a squeeze selection table showing relationships between card game progress states and squeeze motions to be selected according to the progress states and to select one squeeze motion from the squeeze selection table according to a progress state of a card game.

As described above, in the present embodiment, a "squeeze motion" is applied to cards dealt after the second and subsequent times on both of the player side and the banker side. The game controlling portion 130 stores squeeze selection tables specifying which of the plurality of kinds of "squeeze motions" is to be applied according to a progress state of a card, in advance. Then, the game controlling portion 130 selects a suitable squeeze selection table on the basis of a progress state of a card game, for example, betting states on the player side and the banker side, refers to the selected squeeze selection table on the basis of scores on the player side and the banker side, and decides a "squeeze motion" to be executed.

Table 2 shows correspondence relationships of the squeeze selection tables to be selected on the basis of betting states on the player side and the banker side.

TABLE 3

| Player's second card | | | | | | | | | | | |
|---|---|---|---|---|---|---|---|---|---|---|---|
| | | Banker's score | | | | | | | | | |
| | | 0 | 1 | 2 | 3 | 4 | 5 | 6 | 7 | 8 | 9 |
| Player's score | 0 | A | A | A | A | A | A | A | A | A | A |
| | 1 | A | A | A | A | A | A | A | A | A | A |
| | 2 | A | A | A | A | A | A | A | A | A | A |
| | 3 | A | A | A | A | A | A | A | A | A | A |
| | 4 | A | A | A | A | A | A | A | A | A | A |
| | 5 | A | A | A | A | A | A | A | A | A | A |
| | 6 | A | A | A | A | A | A | A | A | A | A |
| | 7 | A | A | A | A | A | A | A | A | A | A |
| | 8 | A | A | A | A | A | A | A | A | A | A |
| | 9 | A | A | A | A | A | A | A | A | A | A |

A 8, 9 squeeze: Perform squeeze aiming for 8 or 9

TABLE 2

| | Main screen | Station screen |
|---|---|---|
| Bet on both of banker/player | Default squeeze selection table (Tables 5 and 8) | Default squeeze selection table (Tables 5 and 8) |
| Bet on banker but no bet on player | Squeeze selection table in the case of placing bet on banker (Tables 7 and 10) | Squeeze selection table in the case of placing bet on banker (Tables 7 and 10) |
| No bet on banker but bet on player | Squeeze selection table in the case of placing bet on player (Tables 6 and 9) | Squeeze selection table in the case of placing bet on player (Tables 6 and 9) |
| Bet on neither of banker nor player (bet only on tie and prog) | Default squeeze selection table (Tables 5 and 8) | Default squeeze selection table (Tables 5 and 8) |

As shown in Table 2, in a case where bets are placed on both of the player side and the banker side and a case where a bet is placed neither on the player side nor on the banker side, a default squeeze selection table (Table 5 or Table 8) is selected. In a case where a bet is placed on the banker side but is not placed on the player side, a squeeze selection table shown in Table 7 or Table 10 is selected. In a case where a bet is not placed on the banker side but is placed on the player side, a squeeze selection table shown in Table 6 or Table 9 is selected.

Squeeze Selection Table Applied to Second Card

Table 3 shows a squeeze selection table applied to the second card dealt on the player side. Table 4 shows a squeeze selection table applied to the second card dealt on the banker side.

TABLE 4

| Banker's second card | | | | | | | | | | | |
|---|---|---|---|---|---|---|---|---|---|---|---|
| | | Banker's score | | | | | | | | | |
| | | 0 | 1 | 2 | 3 | 4 | 5 | 6 | 7 | 8 | 9 |
| Player's score | 0 | A | A | A | A | A | A | A | A | A | A |
| | 1 | A | A | A | A | A | A | A | A | A | A |
| | 2 | A | A | A | A | A | A | A | A | A | A |
| | 3 | A | A | A | A | A | A | A | A | A | A |
| | 4 | A | A | A | A | A | A | A | A | A | A |
| | 5 | A | A | A | A | A | A | A | A | A | A |
| | 6 | B | B | B | B | B | B | B | B | B | B |
| | 7 | B | B | B | B | B | B | B | B | B | B |

TABLE 4-continued

| Banker's second card | | | | | | | | | | |
|---|---|---|---|---|---|---|---|---|---|---|
| | Banker's score | | | | | | | | | |
| | 0 | 1 | 2 | 3 | 4 | 5 | 6 | 7 | 8 | 9 |
| 8 | C | C | C | C | C | C | C | C | C | C |
| 9 | C | C | C | C | C | C | C | C | C | C |

A 8, 9 squeeze: Perform squeeze aiming for 8 or 9

B Condition squeeze: Thoroughly perform squeeze until card is identified (continue performing squeeze unless score is decided)

C Last squeeze: Perform squeeze aiming for opponent's score (squeeze when score is below opponents score and loss is decided)

As shown in Table 3, "8, 9 squeeze" is always selected as a "squeeze motion" irrespective of scores on the player side and the score on the banker side. Further, as shown in Table 4, the "8, 9 squeeze" is selected as a "squeeze motion" when the score on the player side is from 0 to 5, and "condition squeeze" and "last squeeze" are selected when the score on the player side is 6 or 7, and 8 or 9, respectively. Based on a rule that a player-side card is always dealt first and a banker-side card is dealt later, the kinds of squeeze motions specified in the squeeze selection tables applied to the second card are different between the player side and the banker side. The "8, 9 squeeze", the "condition squeeze" and the "last squeeze" will be described later.

Squeeze Selection Table Applied to Third Card on Player Side

Tables 5 to 7 show squeeze selection tables applied to the third card dealt on the player side. Table 5 is a default squeeze selection table that is selected when a bet is placed neither on the player side nor the banker side or when bets are placed on both sides. Table 6 is a squeeze selection table that is selected when a bet is placed on the player side but is not placed on the banker side. Table 7 is a squeeze selection table that is selected when a bet is placed on the banker side but is not placed on the player side.

TABLE 5

| Player's third card (when bet is placed on neither of them or when bet is placed on both (default)) | | | | | | | | | | | |
|---|---|---|---|---|---|---|---|---|---|---|---|
| | | Banker's score | | | | | | | | | |
| | | 0 | 1 | 2 | 3 | 4 | 5 | 6 | 7 | 8 | 9 |
| Player's score | 0 | A | A | A | B | B | B | B | C | — | — |
| | 1 | A | A | A | B | B | B | B | C | — | — |
| | 2 | A | A | A | B | B | B | B | C | — | — |
| | 3 | A | A | A | B | B | B | B | C | — | — |
| | 4 | A | A | A | B | B | B | B | C | — | — |
| | 5 | A | A | A | B | F | B | B | C | — | — |
| | 6 | — | — | — | — | — | — | — | — | — | — |
| | 7 | — | — | — | — | — | — | — | — | — | — |
| | 8 | — | — | — | — | — | — | — | — | — | — |
| | 9 | — | — | — | — | — | — | — | — | — | — |

A 8, 9 squeeze: Perform squeeze aiming for 8 or 9

B Condition squeeze: Thoroughly perform squeeze until card is identified (continue performing squeeze unless score is decided)

C Last squeeze: Perform squeeze aiming for opponent's score (discontinue squeeze when score is below opponent's score and loss is decided F Turn-over Suddenly bring down card without performing squeeze (if picture appears, game is decided)

TABLE 6

| Player's third card (when bet is placed on player) | | | | | | | | | | | |
|---|---|---|---|---|---|---|---|---|---|---|---|
| | | Banker's score | | | | | | | | | |
| | | 0 | 1 | 2 | 3 | 4 | 5 | 6 | 7 | 8 | 9 |
| player's score | 0 | A | A | A | B | B | B | B | C | — | — |
| | 1 | A | A | A | B | B | B | B | C | — | — |
| | 2 | A | A | A | B | B | B | B | C | — | — |
| | 3 | A | A | A | B | B | B | B | C | — | — |
| | 4 | A | A | A | B | B | B | B | C | — | — |
| | 5 | A | A | A | B | F | B | B | C | — | — |
| | 6 | — | — | — | — | — | — | — | — | — | — |
| | 7 | — | — | — | — | — | — | — | — | — | — |
| | 8 | — | — | — | — | — | — | — | — | — | — |
| | 9 | — | — | — | — | — | — | — | — | — | — |

A 8, 9 squeeze: Perform squeeze aiming for 8 or 9

B Condition squeeze: Thoroughly perform squeeze until card is identified (continue performing squeeze unless score is decided)

C Last squeeze: Perform squeeze aiming for opponent's score (discontinue squeeze when score is below opponent's score and loss is decided)

F Turn-over: Suddenly bring down card without performing squeeze (if picture appears, game is decided)

TABLE 7

| Player's third card (when bet is placed on banker) | | | | | | | | | | | |
|---|---|---|---|---|---|---|---|---|---|---|---|
| | | Banker's score | | | | | | | | | |
| | | 0 | 1 | 2 | 3 | 4 | 5 | 6 | 7 | 8 | 9 |
| Player's score | 0 | A | A | A | B | F | F | F | F | — | — |
| | 1 | A | A | A | B | F | F | F | F | — | — |
| | 2 | A | A | A | B | F | F | F | F | — | — |
| | 3 | A | A | A | B | F | F | F | F | — | — |
| | 4 | A | A | A | B | B | F | F | F | — | — |
| | 5 | A | A | A | B | B | B | F | F | — | — |
| | 6 | — | — | — | — | — | — | — | — | — | — |
| | 7 | — | — | — | — | — | — | — | — | — | — |
| | 8 | — | — | — | — | — | — | — | — | — | — |
| | 9 | — | — | — | — | — | — | — | — | — | — |

A 8, 9 squeeze: Perform squeeze aiming for 8 or 9

B Condition squeeze: Thoroughly perform squeeze until card is identified (continue performing squeeze unless score is decided)

C Last squeeze: Perform squeeze aiming for opponent's score (discontinue squeeze when score is below opponent's score and loss is decided)

F Turn-over: Suddenly bring down card without performing squeeze (if picture appears, game is decided)

As shown in Tables 5 to 7, there may be a case where a "turn-over motion" is performed depending on scores on the player side and the banker side. This is because, in the case of the third card, opening a card at once without performing a "squeeze motion", aiming for appearance of a picture, that is, the "turn-over motion" may be performed.

Squeeze Selection Table Applied to Third Card on Banker Side

Tables 8 to 10 show squeeze selection tables applied to the third card dealt on the banker side. Table 8 is a default squeeze selection table that is selected when a bet is placed neither on the player side nor the banker side or when bets are placed on both sides. Table 9 is a squeeze selection table that is selected when a bet is placed on the player side but is not placed on the banker side. Table 10 is a squeeze selection table that is selected when a bet is placed on the banker side but is not placed on the player side.

TABLE 8

Banker's third card (when bet is placed on neither of them or when bet is placed on both (default))

| | | Banker's score | | | | | | | | | |
|---|---|---|---|---|---|---|---|---|---|---|---|
| | | 0 | 1 | 2 | 3 | 4 | 5 | 6 | 7 | 8 | 9 |
| Player's score | 0 | C | F | F | F | F | F | F | — | — | — |
| | 1 | C | C | F | F | F | F | F | — | — | — |
| | 2 | C | C | C | F | F | F | F | — | — | — |
| | 3 | C | C | C | C | F | — | — | — | — | — |
| | 4 | C | C | C | C | C | F | — | — | — | — |
| | 5 | C | C | C | C | C | C | — | — | — | — |
| | 6 | C | C | C | C | C | C | C | — | — | — |
| | 7 | C | C | C | C | C | C | C | — | — | — |
| | 8 | C | C | C | C | C | C | C | — | — | — |
| | 9 | C | C | C | C | C | C | C | — | — | — |

A 8, 9 squeeze: Perform squeeze aiming for 8 or 9
B Condition squeeze: Thoroughly perform squeeze until card is identified (continue performing squeeze unless score is decided)
C Last squeeze: Perform squeeze aiming for opponent's score (discontinue squeeze when score is below opponent's score and loss is decided)
F Turn-over: Suddenly bring down card without performing squeeze (if picture appears, game is decided)

TABLE 9

Banker's third card (when bet is placed on player)

| | | Banker's score | | | | | | | | | |
|---|---|---|---|---|---|---|---|---|---|---|---|
| | | 0 | 1 | 2 | 3 | 4 | 5 | 6 | 7 | 8 | 9 |
| Player's score | 0 | C | C | C | C | C | C | C | — | — | — |
| | 1 | F | C | C | C | C | C | C | — | — | — |
| | 2 | F | F | C | C | C | C | C | — | — | — |
| | 3 | F | F | F | C | C | — | — | — | — | — |
| | 4 | F | F | F | F | C | C | — | — | — | — |
| | 5 | F | F | F | F | F | C | — | — | — | — |
| | 6 | F | F | F | F | F | F | C | — | — | — |
| | 7 | F | F | F | F | F | F | F | — | — | — |
| | 8 | F | F | F | F | F | F | F | — | — | — |
| | 9 | F | F | F | F | F | F | F | — | — | — |

A 8, 9 squeeze: Perform squeeze aiming for 8 or 9
B Condition squeeze: Thoroughly perform squeeze until card is identified (continue performing squeeze unless score is decided)
C Last squeeze: Perform squeeze aiming for opponent's score (discontinue squeeze when score is below opponent's score and loss is decided)
F Turn-over: Suddenly bring down card without performing squeeze (if picture appears, game is decided)

TABLE 10

Banker's third card (when bet is placed on banker)

| | | Banker's score | | | | | | | | | |
|---|---|---|---|---|---|---|---|---|---|---|---|
| | | 0 | 1 | 2 | 3 | 4 | 5 | 6 | 7 | 8 | 9 |
| player's score | 0 | C | F | F | F | F | F | F | — | — | — |
| | 1 | C | C | F | F | F | F | F | — | — | — |
| | 2 | C | C | C | F | F | F | F | — | — | — |
| | 3 | C | C | C | C | F | — | — | — | — | — |
| | 4 | C | C | C | C | C | F | — | — | — | — |
| | 5 | C | C | C | C | C | C | — | — | — | — |
| | 6 | C | C | C | C | C | C | C | — | — | — |
| | 7 | C | C | C | C | C | C | C | — | — | — |
| | 8 | C | C | C | C | C | C | C | — | — | — |
| | 9 | C | C | C | C | C | C | C | — | — | — |

A 8, 9 squeeze: Perform squeeze aiming for 8 or 9
B Condition squeeze: Thoroughly perform squeeze until card is identified (continue performing squeeze unless score is decided)
C Last squeeze: Perform squeeze aiming for opponent's score (discontinue squeeze when score is below opponent's score and loss is decided)
F Turn-over: Suddenly bring down card without performing squeeze (if picture appears, game is decided)

As shown in Tables 8 to 10, a "turn-over motion" is performed more often in comparison with the squeeze selection tables (Tables 5 to 7) about the third card on the player side. This is because, at a time point when the third card is dealt on the banker side, it is less frequent that win/loss is unknown, and, therefore, it is appropriate to discontinue a "squeeze motion" and perform a "turn-over motion".

3-6. Kinds of Squeeze Motions

As stated in the above description of the squeeze selection tables, a plurality of kinds of "squeeze motions" are set so as to selectively used according to progress states of a card game in the present first embodiment.

That is, in the present embodiment, the game controlling portion 130 applies any of plural kinds of "squeeze motions" comprising:

1) a first squeeze motion of discontinuing the "squeeze motion" at a branching timing at which it is identified that none of predicted scores reaches a target score ("8, 9 squeeze");
2) a second squeeze motion of discontinuing the "squeeze motion" at a branching timing at which a score is decided ("condition squeeze");
3) a third squeeze motion of discontinuing the "squeeze motion" at a branching timing at which it is identified that all of predicted scores are below an opponent's score ("last squeeze"); and
4) a turn-over motion of turning over a card from the back surface to the front surface without comprising a "squeeze motion" ("turn-over").

Further, the image generating portion 110 is configured to be capable of changing speed of a "squeeze motion". The game controlling portion 130 is configured to change speed of a "squeeze motion" according to a currently acquired score at the branching timings described before. Three kinds of speed modes, "HIGH", "MID" and "LOW" are set according to height of a value of expectation for a score advantageous to the user being obtained. "HIGH" is a mode for, when an expected value is high, executing a "squeeze motion" slowly to attract luck according to the height of the expected value. The mode is suitable for such a situation that the user feels high tension (a so-called "hot" state). "MID" is a mode for, when the expected value is at a moderate level, executing a "squeeze motion" at a higher speed than "HIGH". The mode is suitable when a final score has been identified, and the user's win has been decided. "LOW" is a mode for, when the expected value is low, closing a card once and then performing a "turn-over motion" if a half or more of the cards is turned over, or further increasing speed of the "squeeze motion" if only less than a half of the cards is turned over. The mode is suitable when a final score has been identified, and the user's loss has been decided.

Next, each of the "squeeze motions" of the "8, 9 squeeze", the "condition squeeze" and the "last squeeze" will be described with reference to flowcharts of FIGS. 12 to 14. It is assumed that speed modes of all the "squeeze motions" are set to HIGH in which, though the expected value is high, the speed of a "squeeze motion" is the slowest.

3-6-1. Flowchart of "8, 9 Squeeze"

Figure 12:
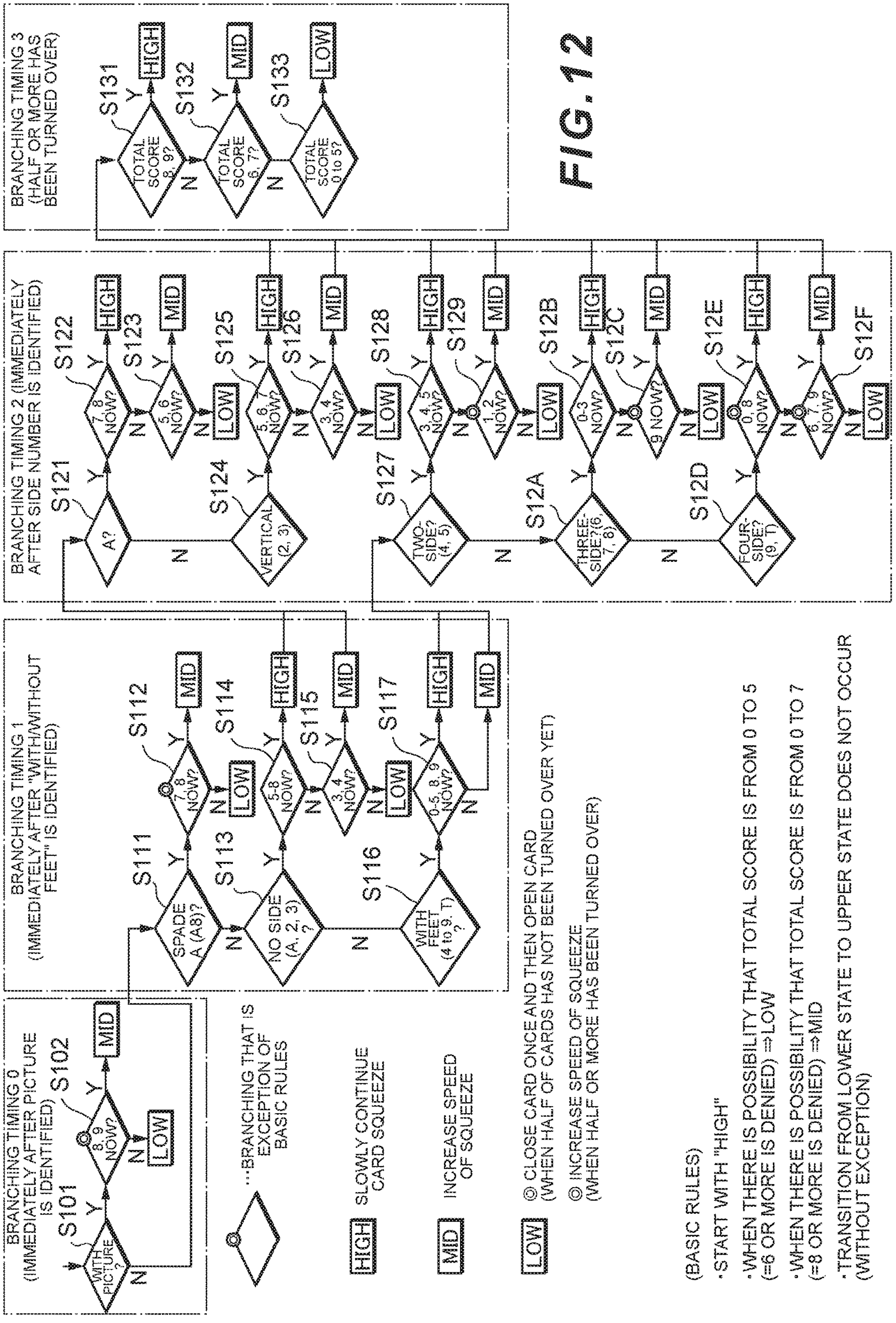
FIG. 12 is a flowchart illustrating a first squeeze motion of discontinuing the squeeze motion at a branching timing at which it is identified that none of predicted scores reaches a target score.

FIG. 12 shows a flowchart illustrating the "8, 9 squeeze", that is, the first squeeze motion of discontinuing the squeeze motion at the branching timing at which it is identified that none of predicted scores reaches a target score. Specifically, the "8, 9 squeeze" is a motion of performing squeeze aiming for a score of 8 or 9, and is mainly applied in the middle of a card game when a win/loss outcome of a card game has not been decided, for example, applied to the second cards on the player side and the banker side or the third card on the player side.

Branching Timing 0

First, at the branching timing 0, it is judged whether a card has a "picture" or not (S101). If it is identified that the card has a "picture" (S101: Y (YES)), it is judged whether or not the score on the side where the card is dealt is 8 or 9 (S102). If it is identified that the card does not have a "picture", (S101: N (NO)), a "squeeze motion" is continued until the branching timing 1. If it is identified at step S102 that the score is 8 or 9 (S102: Y), the speed mode of the "squeeze motion" is changed to MID on the assumption that the game has been won, and the game is ended. If it is identified at step S102 that the score is neither 8 nor 9 (S102: N), the speed mode is changed to LOW on the assumption that the game has been lost, and the "squeeze motion" is discontinued. Then, the game is ended.

Branching Timing 1

At the branching timing 1, it is judged at step S111 whether the card is the ace of spades or not. If it is identified that the card is the ace of spades (S111: Y), it is judged whether or not the score on the side where the card is dealt is 7 or 8 (S112). If it is identified that the card is not the ace of spades (S111: N), the flow transitions to step S113. If it is identified at step S112 that the score is 7 or 8 (S112: Y), the speed mode of the "squeeze motion" is changed to MID on the assumption that the game has been won, and the game is ended. If it is identified at step S112 that the score is neither 7 nor 8 (S112: N), the speed mode is changed to LOW on the assumption that game has been lost, and the "squeeze motion" is discontinued. Then, the game is ended.

At step S113, it is judged whether the "without feet" arrangement is provided or not. If it is identified that the "without feet" arrangement is provided, that is, a predicted score is any of A, 2 and 3 (S113: Y), it is judged whether the score on the side where the card is dealt is any of 5 to 8 (S114). If it is identified that the "without feet" arrangement is not provided (S113: N), the flow transitions to step S116. If it is identified at step S114 that the score is any of 5 to 8 (S114: Y), the speed mode is changed to HIGH, the "squeeze motion" is continued until the branching timing 2, and the flow transitions to step S121. If it is identified at step S114 that the score is not any of 5 to 8 (S114: N), it is judged at step S115 whether or not the score is 3 or 4. If it is identified that the score is 3 or 4 (S115: Y), the speed mode of the "squeeze motion" is changed to MID to continue the "squeeze motion" until the branching timing 2, and the flow transitions to step S121. If it is identified at step S115 that the score is neither 3 nor 4 (S115: N), the speed mode is changed to LOW on the assumption that the game has been lost, and the "squeeze motion" is discontinued. Then, the game is ended.

Step 116 means that the "with feet" arrangement is provided, that is, the score is from 4 to 10. The flow transitions to step S117, and, if the score is any of 0 to 5 and 8 and 9 (S117: Y), the speed mode is changed to HIGH. If the score is not any of 0 to 5 and 8 and 9 (S117: N), the speed mode is changed to MID to continue the "squeeze motion" until the branching timing 2, and the flow transitions to step S127.

Branching Timing 2

Next, at step S121 of the branching timing 2, it is judged that the card is an ace or not. If the card is an ace (S121: Y), the flow transitions to step S122. If the card is not an ace (S121: NO), the flow transitions to step S124.

At step S122, it is judged whether or not the score is 7 or 8. If the score is 7 or 8 (S122: Y), the speed mode is changed to HIGH on the assumption that the game has been won, and the "squeeze motion" is continued to the end. If the score is neither 7 nor 8 (S122: N), the flow transitions to step S123.

At step S123, it is judged whether or not the score is 5 or 6. If the score is 5 or 6 (S123: Y), the speed mode is changed to MID on the assumption that the game has been won, and the "squeeze motion" is continued to the end. If the score is neither 5 nor 6 (S123: N), the speed mode is changed to LOW on the assumption that the game has been lost, and the "squeeze motion" is discontinued.

On the other hand, step S124 is a case where the "vertical arrangement" is provided, and the score is 2 or 3. The flow transitions to step S125.

At step S125, it is judged whether the score is any of 5, 6 and 7. If the score is any of 5, 6 and 7 (S125: Y), the speed mode is changed to HIGH, and the "squeeze motion" is continued until the branching timing 3. If the score is not any of 5, 6 and 7 (S125: N), the flow transitions to step S126.

At step S126, it is judged whether or not the score is 3 or 4. If the score is 3 or 4 (S126: Y), the speed mode is changed to MID, and the "squeeze motion" is continued until the branching timing 3. If the score is neither 3 nor 4 (S126: N), the speed mode is changed to LOW on the assumption that the game has been lost, and the "squeeze motion" is discontinued.

At step S127, it is judged whether or not there are two suits arranged in line along a long side, that is, whether it is two-side or not. In the case of being two-side (S127: Y), the flow transitions to step S128. In the case of not being two-side (S127: N), the flow transitions to step S12A. At step S128, it is judged whether the score is any of 3 to 5. If the score is any of 3 to 5 (S128: Y), the speed mode is changed to HIGH, and the "squeeze motion" is continued until the branching timing 3. If the score is not any of 3 to 5 (S128: N), the flow transitions to step S129.

At step S129, it is judged whether or not the score is 1 or 2. If the score is 1 or 2 (S129: Y), the speed mode is changed to MID, and the "squeeze motion" is continued until the branching timing 3. If the score is neither 1 nor 2 (S129: N), the speed mode is changed to LOW on the assumption that the game has been lost, and the "squeeze motion" is discontinued.

At step S12A, it is judged whether or not there are three suits arranged in line along a long side, that is, whether it is three-side or not. In the case of being three-side (S12A: Y), the flow transitions to step S12B. In the case of not being three-side (S12A: N), the flow transitions to step S12D. At step S12B, it is judged whether the score is any of 0 to 3. If the score is any of 0 to 3 (S12B: Y), the speed mode is changed to HIGH, and the "squeeze motion" is continued until the branching timing 3. If the score is not any of 0 to 3 (S12B: N), the flow transitions to step S12C.

At step S12C, it is judged whether the score is 9. If the score is 9 (S12C: Y), the speed mode is changed to MID, and the "squeeze motion" is continued until the branching timing 3. If the score is not 9 (S12C: N), the speed mode is changed to LOW on the assumption that the game has been lost, and the "squeeze motion" is discontinued.

Step S12D is a case where there are four suits arranged in line along a long side, that is, the case of being four-side, and the flow transitions to step S12E. At step S12E, it is judged whether the score is any of 0 and 8. If the score is any of 0 and 8 (S12E: Y), the speed mode is changed to HIGH, and the "squeeze motion" is continued until the branching timing 3. If the score is neither 0 nor 8 (S12E: N), the flow transitions to step S12F.

At step S12F, it is judged whether the score is any of 6, 7 and 9. If the score is any of 6, 7 and 9 (S12F: Y), the speed mode is changed to MID, and the "squeeze motion" is continued until the branching timing 3. If the score is not any of 6, 7 and 9 (S12F: N), the speed mode is changed to LOW on the assumption that the game has been lost, and the "squeeze motion" is discontinued.

Branching Timing 3

At step S131, if a total score is 8 or 9 (S131: Y), the speed mode is changed to HIGH on the assumption that the game has been won, and the "squeeze motion" is continued to the end. Then, the game is ended. If the total score is neither 8 nor 9, the flow transitions to step S132.

At step S132, if the total score is 6 or 7 (S132: Y), the speed mode is changed to MID on the assumption that the game has been won, and the "squeeze motion" is continued to the end. Then, the game is ended. If the total score is neither 6 nor 7, the flow transitions to step S133.

Step S133 is a case where the total score is from 0 to 5. The speed mode is changed to LOW on the assumption that the game has been lost, and the "squeeze motion" is discontinued. Then, the game is ended.

3-6-2. Flowchart of "Condition Squeeze"

Figure 13:
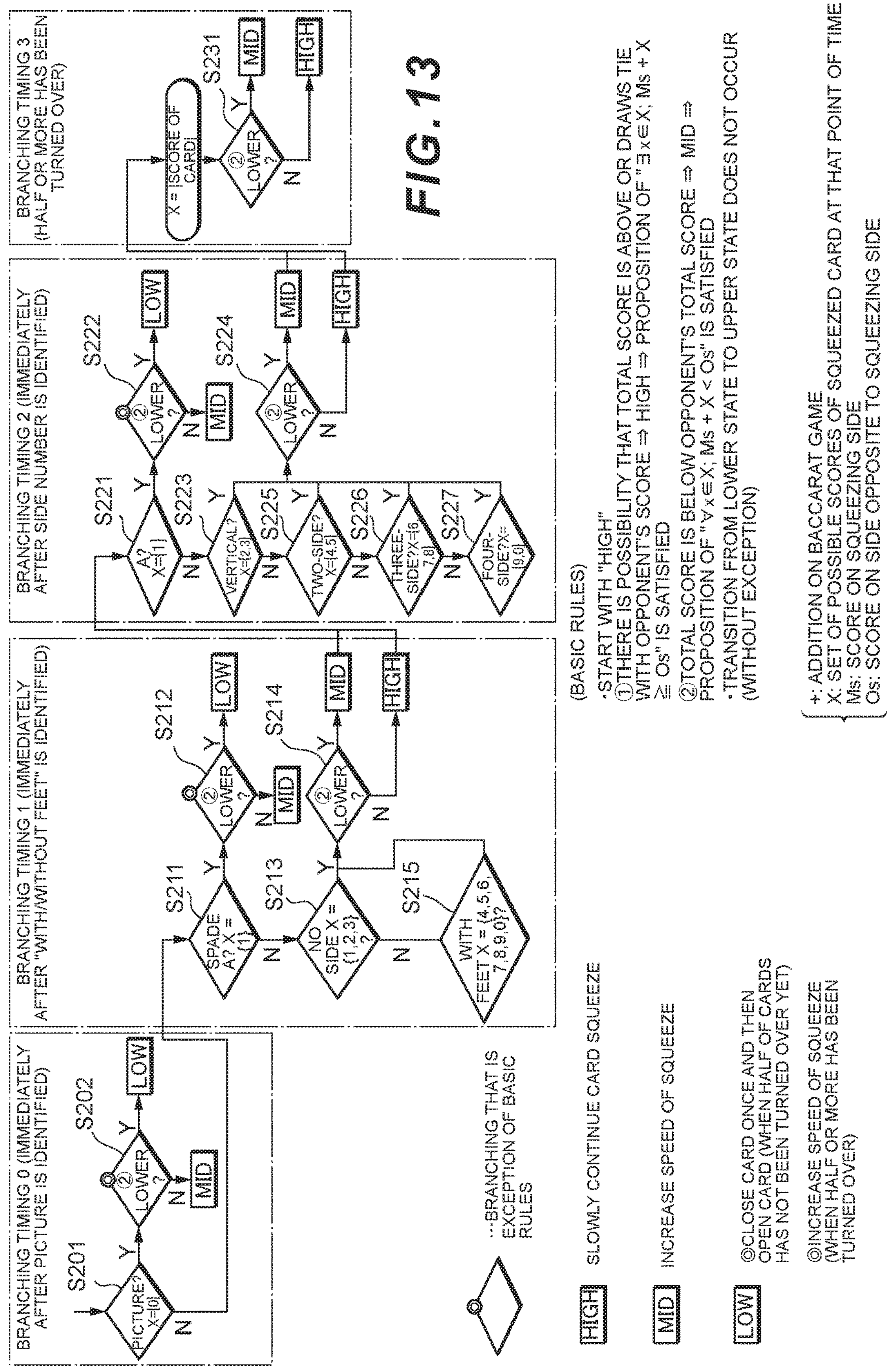
FIG. 13 is a flowchart illustrating a second squeeze motion of discontinuing the squeeze motion at a branching timing at which a final score is identified.

FIG. 13 shows a flowchart illustrating a "condition squeeze", that is, a second squeeze motion of discontinuing the "squeeze motion" at a branching timing at which a score is decided. Specifically, the "condition squeeze" is a motion of thoroughly squeezing a card until the score of the card is known and is a squeeze motion in the case where, even if it is identified that the score is below an opponent's total score, the game may be won according to conditions.

Branching Timing 0

First, at the branching timing 0, it is judged whether a card has a "picture" or not (S201). If it is identified that the card has a "picture" (S201: Y), the flow transitions to step S202. If it is identified that the card does not have a "picture" (S201: N), a "squeeze motion" is continued until the branching timing 1.

At step S202, it is judged whether the score on the own side is below the score of the opponent's side. If it is identified that the score on the own side is below the score of the opponent's side (S202: Y), the speed mode is changed to LOW on the assumption that game has been lost, and the "squeeze motion" is discontinued. Then, the game is ended. If it is identified that the score on the own side is not below the score of the opponent's side (S202: N), the speed mode is changed to MID, and the "squeeze motion" is continued.

Branching Timing 1

At the branching timing 1, it is judged at step S211 whether the card is the ace of spades or not. If it is identified that the card is the ace of spades (S211: Y), the flow transitions to step S212. If the card is not the ace of spades (S211: N), the flow transitions to step S213.

At step S212, it is judged whether the score on the own side is below the score of the opponent's side (S212). If it is identified that the score on the own side is below the score of the opponent's side (S212: Y), the speed mode is changed to LOW on the assumption that game has been lost, and the "squeeze motion" is discontinued. Then, the game is ended. If it is judged that the score on the own side is not below the score on the opponent's side (S212: N), the speed mode is changed to MID, and the game is ended.

If it is identified at step S213 that the card is "without feet" indicating that suits arranged in line along a long side of the card do not exist (S213: Y), the flow transitions to step S214. If it is identified that the card is not "without feet" (S213: Y), the flow transitions to step S215.

At step S214, it is judged whether the score on the own side is below the score of the opponent's side. If it is identified that the score on the own side is below the score of the opponent's side (S214: Y), the speed mode is changed to MID. If it is identified that the score on the own side is not below the score of the opponent's side (S214: N), the speed mode is changed to HIGH, and the "squeeze motion" is continued until the branching timing 2.

Step S215 is a case where a "with feet" arrangement is judged, that is, it is judged that the score is any of 4 to 10. The flow transitions to step S214.

Branching Timing 2

At the branching timing 2, it is judged at step S221 whether the score is an ace (1). If it is judged that the card is an ace (S221: Y), the flow transitions to step S222. If it is judged that the card is not an ace (S221: N), the flow transitions to step S223.

At step S222, it is judged whether the score on the own side is below the score of the opponent's side. If it is identified that the score on the own side is below the score of the opponent's side (S222: Y), the speed mode is changed to LOW on the assumption that game has been lost, and the "squeeze motion" is discontinued. Then, the game is ended. If it is judged that the score on the own side is not below the score on the opponent's side (S222: N), the speed mode is changed to MID, and the game is ended.

In a case where the "vertical" arrangement is provided, that is, the score is 2 or 3 at step S223 (S223: Y), in a case where, though the score is neither 2 nor 3 (S223: N), the suit arrangement is two-pin (S225: Y), in a case where the suit arrangement is not two-pin (S225: N) but three-pin (S226: Y), and in a case where the suit arrangement is not three-pin (S226: N) but four-pin (S227), the flow transitions to step S224 in any of the cases.

At step S224, it is judged whether the score on the own side is below the score of the opponent's side. If it is identified that the score on the own side is below the score of the opponent's side (S224: Y), the speed mode is changed to MID. If it is identified that the score on the own side is not below the score of the opponent's side (S224: N), the speed mode is changed to HIGH. In both cases, the "squeeze motion" is continued until the branching timing 3.

Branching Timing 3

At the branching timing 3, it is judged at step S231 whether the score on the own side is below the score of the opponent's side. If it is identified that the score on the own side is below the score of the opponent's side (S231: Y), the speed mode is changed to MID on the assumption that game has been lost, and the "squeeze motion" is continued to the end. Then, the game is ended. If it is judged that the score on the own side is not below the score on the opponent's side (S231: N), the speed mode is changed to HIGH on the assumption that the game has been won, and the "squeeze motion" is continued to the end. Then, the game is ended.

3-6-3. Flowchart of "Last Squeeze"

Figure 14:
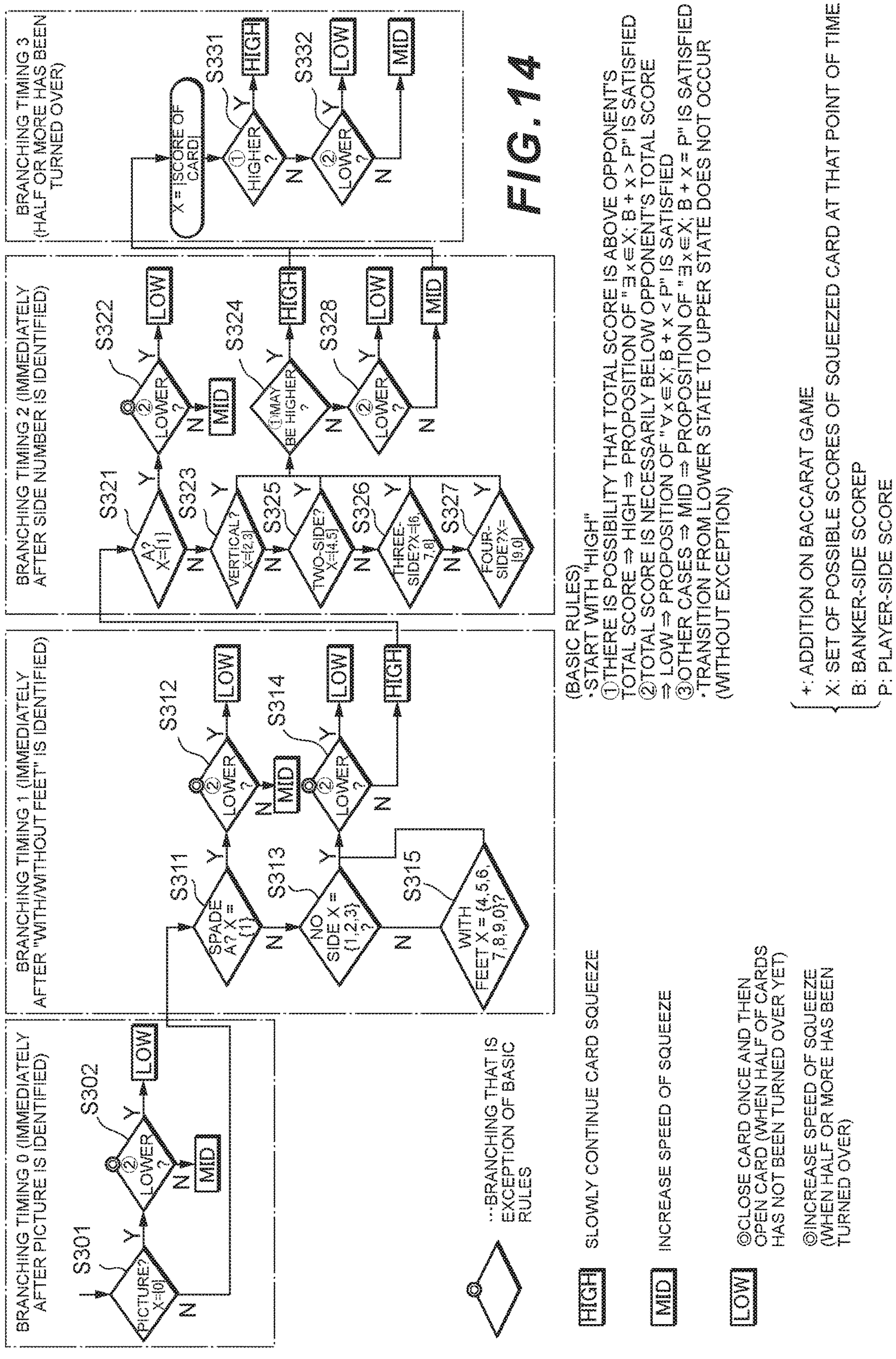
FIG. 14 is a flowchart illustrating a third squeeze motion of discontinuing the squeeze motion at a branching timing at which it is identified that all of the predicted scores are below an opponent's score.

FIG. 14 shows a flowchart illustrating "last squeeze", that is, a third squeeze motion of discontinuing a "squeeze motion" at a branching timing at which it is identified that all predicted scores are below an opponent's score. Specifically, the "last squeeze" is a motion of performing squeeze aiming for the opponent's score, in which, when it is identified that the own score is below the opponent's total score, the "squeeze motion" is discontinued.

Branching Timing 0

First, at the branching timing 0, it is judged whether a card has a "picture" or not (S301). If it is identified that the card has a "picture" (S301: Y), the flow transitions to step S302.

If it is identified that the card does not have a "picture" (S301: N), a "squeeze motion" is continued until the branching timing 1.

At step S302, it is judged whether the score on the own side is below the score of the opponent's side. If it is identified that the score on the own side is below the score of the opponent's side (S302: Y), the speed mode is changed to LOW on the assumption that game has been lost, and the "squeeze motion" is discontinued. Then, the game is ended. If it is identified that the score on the own side is not below the score of the opponent's side (S302: N), the speed mode is changed to MID, and the "squeeze motion" is continued.

Branching Timing 1

At the branching timing 1, it is judged at step S311 whether the card is the ace of spades or not. If it is identified that the card is the ace of spades (S311: Y), the flow transitions to step S312. If the card is not the ace of spades (S311: N), the flow transitions to step S313.

At step S312, it is judged whether the score on the own side is below the score of the opponent's side (S312). If it is identified that the score on the own side is below the score of the opponent's side (S312: Y), the speed mode is changed to LOW on the assumption that game has been lost, and the "squeeze motion" is discontinued. Then, the game is ended. If it is judged that the score on the own side is not below the score on the opponent's side (S312: N), the speed mode is changed to MID, and the game is ended.

If it is identified at step S313 that the card is "without feet" indicating that suits arranged in line along a long side of the card do not exist (S313: Y), the flow transitions to step S314. If it is identified that the card is not "without feet" (S313: Y), the flow transitions to step S315.

At step S314, it is judged whether the score on the own side is below the score of the opponent's side. If it is identified that the score on the own side is below the score of the opponent's side (S314: Y), the speed mode is changed to LOW on the assumption that game has been lost, and the "squeeze motion" is discontinued. Then, the game is ended. If it is judged that the score on the own side is not below the score of the opponent's side (S314: N), the speed mode is set to HIGH, and the "squeeze motion" is continued until the branching timing 2.

Step S315 is a case where the "with feet" arrangement is judged, that is, it is judged that the score is any of 4 to 10. The flow transitions to step S314.

Branching Timing 2

At the branching timing 2, it is judged at step S321 whether the card is an ace (1). If it is judged that the card is an ace (S321: Y), the flow proceeds to step S222. If it is judged that the card is not an ace (S321: N), the flow transitions to step S223.

At step S322, it is judged whether the score on the own side is below the score of the opponent's side. If it is identified that the score on the own side is below the score of the opponent's side (S322: Y), the speed mode is changed to LOW on the assumption that game has been lost, and the "squeeze motion" is discontinued. Then, the game is ended. If it is judged that the score on the own side is not below the score on the opponent's side (S322: N), the speed mode is changed to MID, and the game is ended.

In a case where the "vertical" arrangement is provided, that is, the score is 2 or 3 at step S323 (S323: Y), in a case where, though the score is neither 2 nor 3 (S323: N), the suit arrangement is two-pin (S325: Y), in a case where the suit arrangement is not two-pin (S325: N) but three-pin (S326: Y), and in a case where the suit arrangement is not three-pin (S326: N) but four-pin (S327), the flow proceeds to step S324 in any of the cases.

At step S324, it is judged whether the score on the own side is above the score on the opponent's side. If it is identified that the score on the own side is above the score on the opponent's side (S324: Y), the speed mode is changed to HIGH, and the "squeeze motion" is continued until the branching timing 3. If it is identified that the score on the own side is not above the score on the opponent's side (S324: N), and it is identified that the score on the own side is below the score on the opponent's side (S328: Y), the speed mode is changed to LOW on the assumption that the game has been lost, and the game is ended. On the other hand, if it is identified that the score on the own side is not below the score of the opponent's side (S328: N), the speed mode is set to MID, and the "squeeze motion" is continued until the branching timing 3.

Branching Timing 3

At the branching timing 3, it is judged at step S331 whether the score on the own side is above the score of the opponent's side. If it is identified that the score on the own side is above the score of the opponent's side (S331: Y), the speed mode is changed to HIGH on the assumption that game has been won, and the "squeeze motion" is continued to the end. Then, the game is ended. If it is judged that the score on the own side is not above the score on the opponent's side (S331: N), the flow transitions to step S332.

At step S332, it is judged whether the score on the own side is below the score of the opponent's side. If it is identified that the score on the own side is below the score of the opponent's side (S332: Y), the speed mode is changed to LOW on the assumption that game has been lost, and the "squeeze motion" is discontinued. Then, the game is ended. If it is judged that the score on the own side is not below the score on the opponent's side (S332: N), the speed mode is changed to MID, and the "squeeze motion" is continued to the end.

4. Summary

When operations of the above embodiment are summarized, Tables 11 and 13 are obtained.

Table 11 is a table in which motion numbers and patterns of the "squeeze motion" are summarized. Table 12 is a table in which state transition of the speed mode at branching timings and selected motion numbers are summarized. For motions 1 to 4, relative speeds of the "squeeze motion" are described. FIG. 17 is a table of relationships among cards dealt to the player side and the banker side, the motions 1 to 4 and the branching timings.

TABLE 11

Table of motion numbers and motions

| Motion number | Motion 1 | Motion 2 | Motion 3 | Motion 4 |
|---|---|---|---|---|
| 1 | Perform squeeze without haste | Perform squeeze without haste | Perform squeeze without haste | Perform squeeze without haste and finish turn-over |
| 2 | Perform squeeze without haste | Perform squeeze without haste | Turned over after stop | |

TABLE 11-continued

| Table of motion numbers and motions | | | | |
|---|---|---|---|---|
| Motion number | Motion 1 | Motion 2 | Motion 3 | Motion 4 |
| 3 | Perform squeeze without haste | Quickly perform squeeze | Quickly perform squeeze | Quickly perform squeeze and finish turn-over |
| 4 | Perform squeeze without haste | Turned over after stop | | |
| 5 | Without haste → frame | | | |

TABLE 12

| State transition and selected motion number | | | | | | | | |
|---|---|---|---|---|---|---|---|---|
| Branch 0 | Branch 1 | Branch 2 | Branch 3 | Motion number | Motion 1 | Motion 2 | Motion 3 | Motion 4 |
| MID | — | — | — | 5 | Without haste → frame | | | |
| LOW | — | — | — | 5 | Without haste → frame | | | |
| HIGH | MID | — | — | 3 | Perform squeeze without haste | Quickly perform squeeze | Quickly perform squeeze | Quickly perform squeeze and finish turn-over |
| HIGH | LOW | — | — | 4 | Perform squeeze without haste | Turned over after stop | | |
| HIGH | HIGH | HIGH | — | 1 | Perform squeeze without haste | Perform squeeze without haste | Perform squeeze without haste | Perform squeeze without haste and finish turn-over |
| HIGH | HIGH | MID | — | 1 | Perform squeeze without haste | Perform squeeze without haste | Perform squeeze without haste | Perform squeeze without haste and finish turn-over |
| HIGH | HIGH | LOW | — | 2 | Perform squeeze without haste | Perform squeeze without haste | Turned over after stop | |
| HIGH | MID | MID | — | 3 | Perform squeeze without haste | Quickly perform squeeze | Quickly perform squeeze | Quickly perform squeeze and finish turn-over |
| HIGH | MID | LOW | — | 3 | Perform squeeze without haste | Quickly perform squeeze | Quickly perform squeeze | Quickly perform squeeze and finish turn-over |
| HIGH | HIGH | HIGH | HIGH | 1 | Perform squeeze without haste | Perform squeeze without haste | Perform squeeze without haste | Perform squeeze without haste and finish turn-over |
| HIGH | HIGH | HIGH | MID | 1 | Perform squeeze without haste | Perform squeeze without haste | Perform squeeze without haste | Perform squeeze without haste and finish turn-over |
| HIGH | HIGH | HIGH | LOW | 1 | Perform squeeze without haste | Perform squeeze without haste | Perform squeeze without haste | Perform squeeze without haste and finish turn-over |
| HIGH | HIGH | MID | MID | 1 | Perform squeeze without haste | Perform squeeze without haste | Perform squeeze without haste | Perform squeeze without haste and finish turn-over |
| HIGH | HIGH | MID | LOW | 1 | Perform squeeze without haste | Perform squeeze without haste | Perform squeeze without haste | Perform squeeze without haste and finish turn-over |
| HIGH | MID | MID | MID | 3 | Perform squeeze without haste | Quickly perform squeeze | Quickly perform squeeze | Quickly perform squeeze and finish turn-over |
| HIGH | MID | MID | LOW | 3 | Perform squeeze without haste | Quickly perform squeeze | Quickly perform squeeze | Quickly perform squeeze and finish turn-over |

As shown in Table 11, motion patterns of the "squeeze motion" on a card are indicated by motion numbers 1 to 5. According to FIGS. 12 to 14, any card is expressed by a motion pattern that belongs any of the five patterns indicated by the motion numbers 1 to 5 during a period from start to end of the "squeeze motion".

The motion number 1 indicates a motion pattern in a case where the degree of expectation for winning a game is high, and "squeeze without haste" with the speed mode of HIGH continues to the end. The motion number 2 indicates a motion pattern in a case where loss is identified in the middle of the game. Though the speed mode is HIGH in the motions 1 and 2, the speed mode changes to LOW in the motion 3, and a "squeeze motion" is discontinued. The motion number 3 indicates a motion pattern in which the speed mode is MID in the motions 2 and 3. The motion number 4 indicates a motion pattern in a case where it is identified at the branching timing 1 that a game has been lost. The motion number 5 indicates a motion pattern in a case where, since a "frame" is identified, a "squeeze motion" is discontinued at the branching timing 0.

As shown in Table 12, by variously changing the speed mode of a "squeeze motion" according to the branching timings 0 to 3, staging of motion pattern corresponding to a state is possible. Further, as shown in FIG. 17, staging of motion pattern as shown in the motions 1 to 4 is also possible according to at what position in deal order a target card is.

5. Effects of the Present First Embodiment (5-1) According to the present first embodiment, it is possible to, by discontinuing a "squeeze motion" at an appropriate timing according to a progress state of a card game, provide a realistic game environment close to a real card game and save time taken for useless "squeeze motions".

(5-2) According to the present first embodiment, since branching timings are set to be adapted to "oblique squeeze", it is possible to control appropriate progress of a card game in the case of executing the "oblique squeeze" as a "squeeze motion".

(5-3) According to the present first embodiment, since plural kinds of "squeeze motions" are set, it becomes possible to select a "squeeze motion" appropriate for a progress state of a card game.

(5-4) According to the present first embodiment, since different squeeze selection tables are used according to a betting state or according to whether a card is the second card or the third card, it becomes possible to select a "squeeze motion" appropriate for a progress state of a card game.

(5-5) According to the present first embodiment, since speed of a squeeze motion is appropriately changed according to a progress state of a card game, it becomes possible to, by decreasing speed of a "squeeze motion" to increase tension if necessary and increasing the speed of the "squeeze motion" if unnecessary, perform efficient card game progress management.

(5-6) According to the present first embodiment, since a "squeeze motion" is not executed for a card dealt first neither on the player side nor the banker side, it becomes possible to omit useless "squeeze motions" and perform efficient card game progress management.

Second Embodiment

The first embodiment described above shows a case where the present disclosure is applied to "oblique squeeze" of performing a "squeeze motion" from a corner part of a card. The present second embodiment relates to a card game apparatus in a case where the present disclosure is applied to "vertical squeeze" of performing a "squeeze motion" from a short side of a card.

In the present second embodiment, since 1. System configuration, 2. Flow of card game and 3. Configuration of sub controller 100 are the same as those of the first embodiment described above, description thereof will be omitted. Further, 3-1. Generation of squeeze image, 3-2. Decision of whether squeeze motion is to be performed or not, 3-5. Setting of squeeze selection table and 3-6. Kinds of squeeze motions are also basically the same as those of the first embodiment described above.

Figure 15:
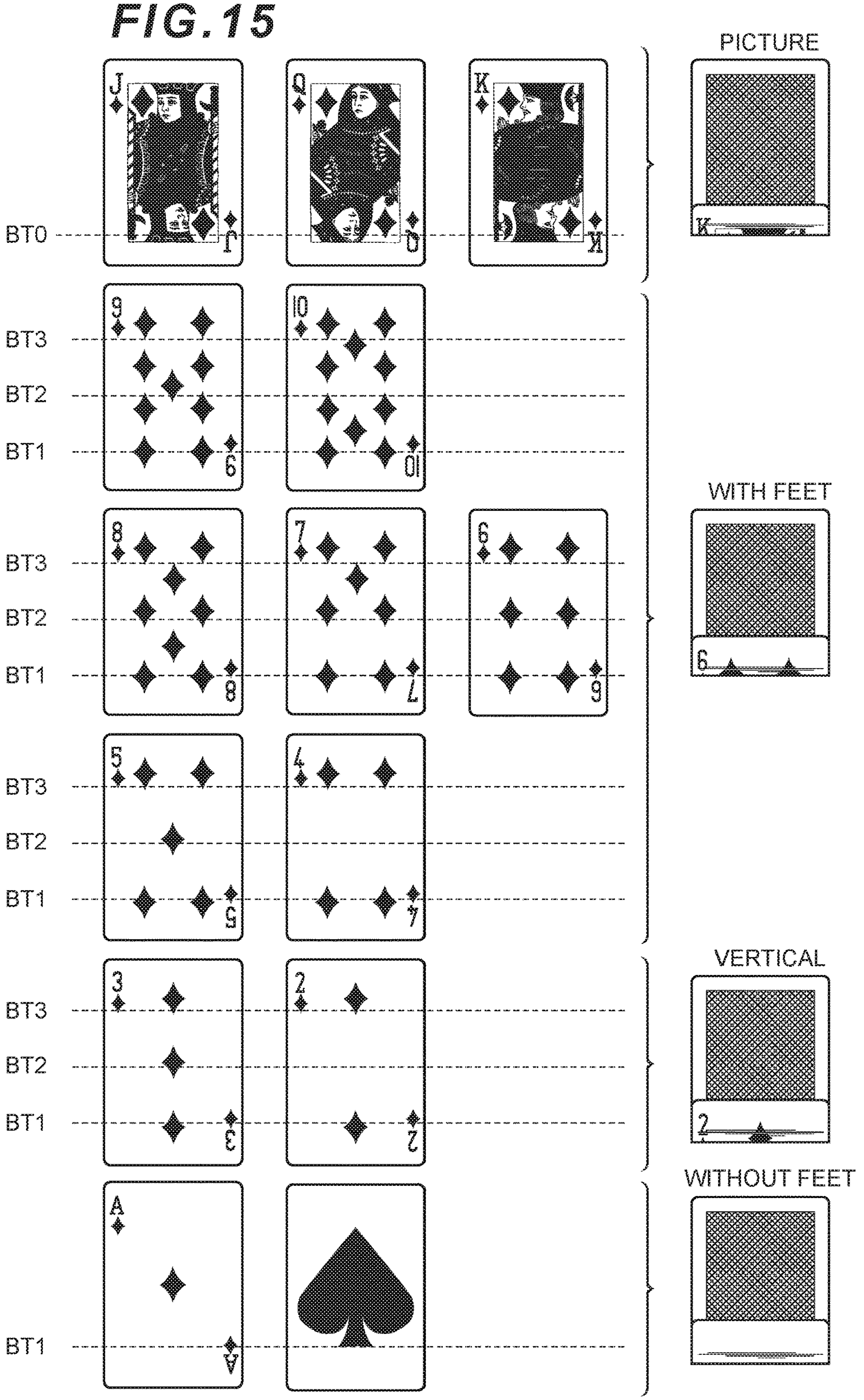
FIG. 15 illustrates an example of setting branching timings at the time of performing the squeeze motion from a short side of a card and how a part of a suit is (or suits are) seen according to a second embodiment.

Modification of 3-3. Predicted Score That Changes According to Degree of Progress of Squeeze Motion FIG. 15 illustrates how a part of a suit is (suits are) seen at the time of performing a squeeze motion (vertical squeeze) from a short side of a card. The case of performing a squeeze motion (horizontal squeeze) from a long side of a card will be described later in a third embodiment. As shown in FIG. 15, when each of the fourteen kinds of cards shown on the left side is turned over from a short side, a part of the surface of the card comes to be seen as shown on the right side. In FIG. 15, it is assumed that a number at a corner is not seen. In an actual card game, a user turns over a card hiding a number part at an end of the card with a finger. In the present embodiment, the image generating portion 110 generates image data in a manner that the number part existing on an end of a card is not displayed.

When a "squeeze motion" is performed up to the line BT0, existence/non-existence of a picture (a frame) can be judged first because a picture is recorded up to vicinities of end parts of a card. In the case of a "picture", the final score of the card is zero.

In the case of a suit which is the ace of spades, when the "squeeze motion" is performed up to the line BT1 next, a part of the suit is seen. Therefore, the final score is 1. If suits are not seen on the right nor left at the line BT1, this is a "without feet" arrangement, and it can be predicted that a possible predicted score is an ace (1) other than the ace of spades, 2 or 3. If suits are seen on the right and left at the line BT1, this is the "with feet" arrangement, and a possible predicted score is from 4 to 10.

In the case of the "without feet" arrangement, when the "squeeze motion" is performed up to the line BT2, an ace (1) other than the ace of spades comes to be seen. Therefore, the final score is 1. If one suit is seen at the center at the line BT2, this is the "vertical" arrangement. A possible predicted score is 2 or 3. Furthermore, if two suits are seen on the right and left at the line BT2, this is the "with feet" arrangement. If the number of suits arranged in line along a long side of the card is identified to be two (two-pin), a predicted score is 4 or 5. If the number is identified to be three (three-pin), a predicted score is from 6 to 8. If the number is identified to be four (four-pin), a predicted score is 9 or 10.

In the case of the "vertical" arrangement, when the "squeeze motion" is further performed up to the line BT3, it is identified that the final score is 2 or 3. Further, in the case of being two-pin at the line BT3, the final score is identified to be 4 or 5. Furthermore, in the case of being three-pin at the line BT3, the final score is identified to be any of 6 to 8. Furthermore, in the case of being four-pin at the line BT4, the final score is identified to be 9 or 10.

(Modification of 3-4. Setting of Branching Timing)

As described above, in the present second embodiment, timings of a "squeeze motion" corresponding to the lines BT0 to BT3 in FIG. 15 are set as the branching timings 0 to 3.

That is, in the present second embodiment, as branching timings to decide whether a "squeeze motion" is to be discontinued or speed of the "squeeze motion" is to be changed, according to a predicted score that comes to be seen at the middle stage of the "squeeze motion", the game controlling portion 130 sets:

1) the branching timing 0 when existence/non-existence of a picture is identified;

2) the branching timing 1 when existence/non-existence of suits arranged in line along a short side of a card or the number of suits arranged in line along a short side of a card is identified;

3) the branching timing 2 when existence/non-existence of suits arranged in line along a long side of a card or the number of suits arranged in line along a long side is identified; and 4) the branching timing 3 when a score is decided.

Table 14 collectively shows relationships of predicted scores or final scores decided for the above branching timings, respectively, as the "squeeze motion" (vertical squeeze) progresses according to the present second embodiment.

TABLE 14

| Branching timing 0 | Branching timing 1 | Branching timing 2 | Branching timing 3 | Predicted score | Final score |
|---|---|---|---|---|---|
| Having picture is identified | | | | | 0 |
| Having no picture is identified | A of spades is identified | | | | 1 |
| | A (1) is identified | | | | 1 |
| | "vertical" arrangement is identified | | | 2, 3 | |
| | | 2 is identified | | | 2 |
| | | 3 is identified | | | 3 |
| | "with feet" is identified | | | 4-10 | |
| | | "Two-pin" is identified | | 4, 5 | |
| | | | 4 is identified | | 4 |
| | | | 5 is identified | | 5 |
| | | "Three-pin" is identified | | 6-8 | |
| | | | 6 is identified | | 6 |
| | | | 7 is identified | | 7 |
| | | | 8 is identified | | 8 |
| | | "Four-pin" is identified | | 9, 10 | |
| | | | 9 is identified | | 9 |
| | | | 10 is identified | | 10 |

As described above, though the present second embodiment is the same as the first embodiment in a point that branching timings are the four lines BT0 to BT3 but is different in a predicted score and a final score identified at each timing. However, the basic way of thinking that a predicted score and a final score are determined according to a branching timing to cause a "squeeze motion" to progress is similar to that of the first embodiment described above. Therefore, in the present second embodiment also, setting of squeeze selection tables and kinds of "squeeze motions" selected in a squeeze selection table can be modified and performed according to the first embodiment described above.

According to the present second embodiment, in addition to operation and effects similar to those of the first embodiment described above being obtained, it is possible to control appropriate card game progress in the case of executing "vertical squeeze" as a "squeeze motion" because branching timings are set to be adapted to the "vertical squeeze".

Third Embodiment

The first embodiment described above shows case where the present disclosure is applied to "oblique squeeze" of performing a "squeeze motion" from a corner of a card and the second embodiment described above shows case where the present disclosure is applied to "vertical squeeze" of performing a "squeeze motion" from a short side of a card, respectively. The present third embodiment relates to a card game apparatus in which the present disclosure is applied to "horizontal squeeze" of performing a "squeeze motion" from a long side of a card.

In the present third embodiment, since 1. System configuration, 2. Flow of card game and 3. Configuration of sub controller 100 are the same as those of the first embodiment described above, description thereof will be omitted. Further, 3-1. Generation of squeeze image, 3-2. Decision of whether squeeze motion is to be performed or not, 3-5. Setting of squeeze selection table and 3-6. Kinds of squeeze motions are also basically the same as those of the first embodiment described above.

Figure 16:
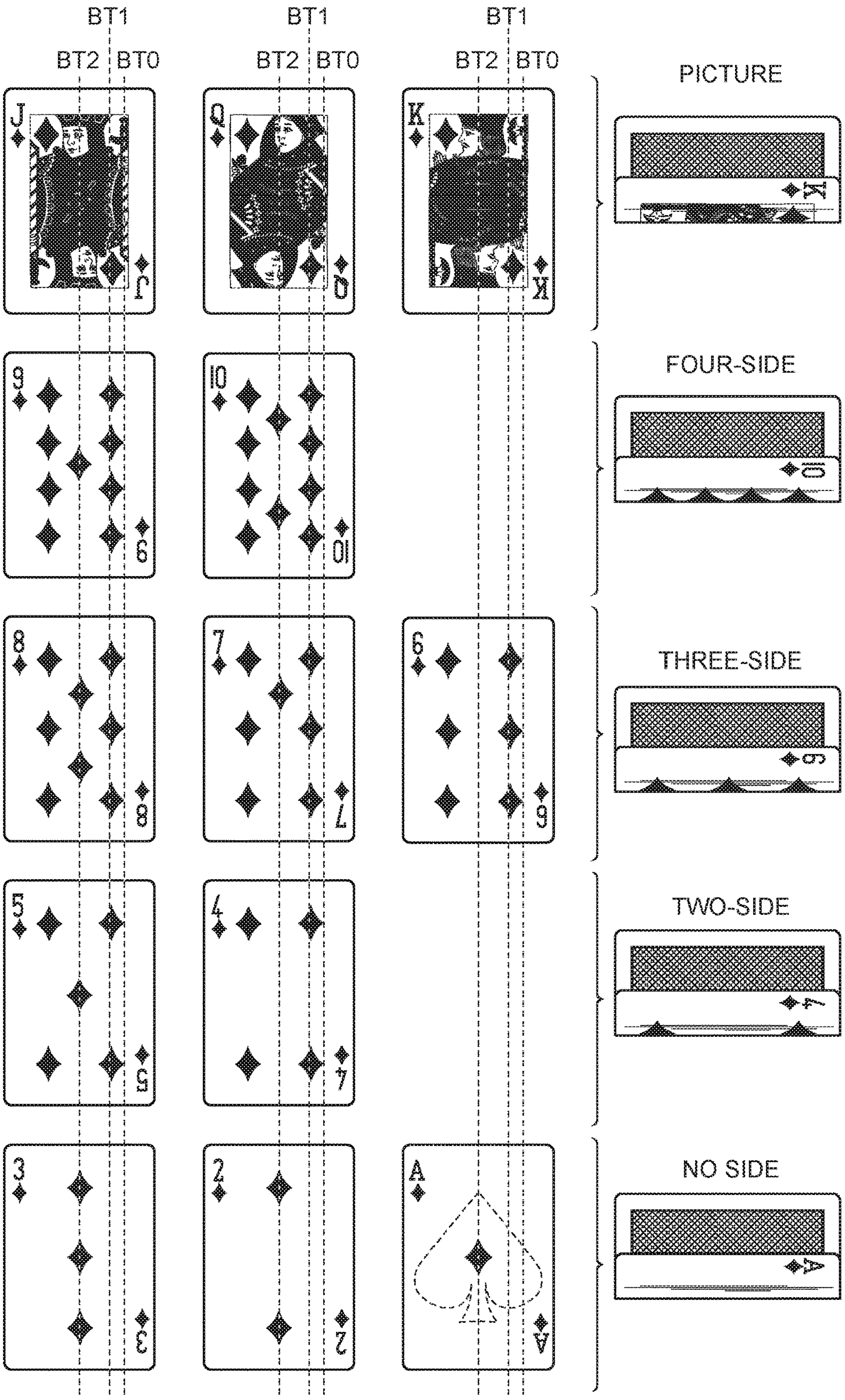
FIG. 16 illustrates an example of setting branching timings at the time of performing the squeeze motion from a long side of a card and how a part of a suit is (or suits are) seen according to a third embodiment.

Modification of 3-3. Predicted Score That Changes According to Degree of Progress of Squeeze Motion FIG. 16 illustrates how a part of a suit is (suits are) seen at the time of performing a squeeze motion (horizontal squeeze) from a long side of a card. As shown in FIG. 16, when each of the thirteen kinds of cards shown on the left side is turned over from a long side, a part of the surface of the card comes to be seen as shown on the right side. In FIG. 16, it is assumed that a number at a corner is not seen. In an actual card game, a user turns over a card hiding a number part at an end of the card with a finger. In the present embodiment, the image generating portion 110 generates image data in a manner that the number part existing on an end of a card is not displayed.

When a "squeeze motion" is performed up to the line BT0, existence/non-existence of a picture can be judged first because a picture is recorded up to vicinities of end parts of a card. In the case of a "picture", the final score of the card is zero.

In the case of a suit which is the ace of spades, when the "squeeze motion" is performed up to the line BT1 next, a part of the suit is seen large as shown by a dotted line in FIG. 16. Therefore, the final score is 1. If a suit is not seen at the line BT1, this is a "no side" (the same as "without feet") arrangement, and it can be predicted that a possible predicted score is an ace (1) other than the ace of spades, 2 or 3. If two suits are seen at the line BT1, this is a "two-side" (the same as "two-pin") arrangement, and it can be predicted that a possible predicted score is 4 or 5. If three suits are seen at the line BT1, this is a "three-side" (the same as "three-pin") arrangement, and it can be predicted that a possible predicted score is 6, 7 or 8. If four suits are seen at the line BT1, this is a "four-side" (the same as "four-pin") arrangement, and it can be predicted that a possible predicted score is 9 or 10.

Furthermore, when the "squeeze motion" is performed up to the line BT2, all the scores are decided. That is, in the case of the "no side" arrangement, the final score is identified to be 1, 2 or 3. In the case of the "two-side" arrangement, the final score is identified to be 4 or 5. In the case of the "three-side" arrangement, the final score is identified to be any of 6, 7 and 8. In the case of the "four-side" arrangement, the final score is identified to be any of 9 and 10.

Modification of 3-4. Setting of Branching Timing

As described above, in the present third embodiment, timings of a "squeeze motion" corresponding to the lines BT0 to BT2 in FIG. 16 are set as the branching timings 0 to 2.

That is, in the present third embodiment, as branching timings to decide whether a "squeeze motion" is to be discontinued or speed of the "squeeze motion" is to be changed, according to a predicted score that comes to be seen at the middle stage of the "squeeze motion", the game controlling portion 130 sets:

1) the branching timing 0 when existence/non-existence of a picture is identified;
2) the branching timing 1 when whether suits arranged in line along a long side of a card exist or the number of suits arranged in line along a long side is identified; and
3) the branching timing 2 when a final score is identified.

Table 15 correctively shows relationships of predicted scores or final scores decided for the above branching timings, respectively, as a "squeeze motion" (horizontal squeeze) progresses according to the present third embodiment.

TABLE 15

| Branching timing 0 | Branching timing 1 | Branching timing 2 | Predicted score | Final score |
|---|---|---|---|---|
| Having picture is identified | | | | 0 |
| Having no picture is identified | A of spades is identified | | | 1 |
| | "No side" is identified | | 1-3 | |
| | | A (1) is identified | | 1 |
| | | 2 is identified | | 2 |
| | | 3 is identified | | 3 |
| | "Two-side" is identified | | 4, 5 | |
| | | 4 is identified | | 4 |
| | | 5 is identified | | 5 |
| | "Three-side" is identified | | 6-8 | |
| | | 6 is identified | | 6 |
| | | 7 is identified | | 7 |
| | | 8 is identified | | 8 |
| | "Four-side" is identified | | 9, 10 | |
| | | 9 is identified | | 9 |
| | | 10 is identified | | 10 |

As described above, branching timings are the three lines BT0 to BT2 in the present third embodiment, which is different from the first and second embodiments described above in which there are four branching timings. However, the basic way of thinking that a predicted score and a final score are determined according to a branching timing to cause a "squeeze motion" to progress is similar to that of the first embodiment described above. Therefore, in the present third embodiment also, setting of squeeze selection tables and kinds of "squeeze motions" selected in a squeeze selection table can be modified and performed according to the first embodiment described above.

According to the present third embodiment, in addition to operation and effects similar to those of the first embodiment described above being obtained, it is possible to control appropriate card game progress in the case of executing "horizontal squeeze" as a "squeeze motion" because branching timings are set to be adapted to the "horizontal squeeze".

INDUSTRIAL APPLICABILITY

In the embodiments described above, the present disclosure is applied to a card game apparatus for playing baccarat as a card game. However, for any card game in which it is effective to execute a "squeeze motion", the present disclosure can be appropriately modified and used.

Further, though description has been made on a card game apparatus in which "oblique squeeze", "vertical squeeze" and "horizontal squeeze" are executed as a "squeeze motion" in the embodiments described above, it is possible to modify and apply the present disclosure to a card game apparatus in which other "squeeze motions" are executed. As an example, a plurality of "squeeze motions" may be combined. For example, by executing "vertical squeeze" until a branching timing in the middle of the squeeze motion (for example, the branching timing 1) and then advancing and executing "horizontal squeeze" until the branching timing in the middle of the squeeze motion (for example, the branching timing 2) after the card is closed down once, a predicted score and a final score are sequentially decided. In short, it is only necessary that a plurality of branching timings are set in such order that the number of predicted scores is gradually decreasing or the number of final scores are gradually increasing as a "squeeze motion" progresses, and the direction and aspect of the "squeeze motion" are not especially limited. No matter which "squeeze motion" is to be performed, it is only necessary to specify a processing procedure for each branching timing according to the embodiments described above.

LIST OF REFERENCE NUMERALS

100, 100-1 to 100-5 Sub controller (card game apparatus)
110 Image generating portion (squeeze image generating portion)
112 Moving image generating portion
114 Image storing portion
116 Object arranging portion
118 Viewpoint setting portion
120 Projection transforming portion
122 Mapping portion
124 Background image generating portion
130 Game controlling portion
200, 200-1 to **200-*n*** Station
201 Touch panel equipped display
202 Operation portion
300 Main controller
301 Main display
1000 Card game system

The invention claimed is:

1. A card game apparatus comprising:

a processor configured to:

generate a squeeze image to show on a display a squeeze motion of a card being turned over from an end, from a back surface to a front surface, control progress of a card game, including determining, for at least one of a plurality of branching timings, a predicted score using a part of one or more suits on the card that appear during the squeeze motion, determine whether or not the squeeze motion is at one of the plurality of branching timings at which the predicted score changes, and automatically discontinue the squeeze motion based on the predicted score; and a display controller configured to output the squeeze image to a display.

2. The card game apparatus according to claim 1, wherein the plurality of branching timings includes one or more of:

1) a timing at which existence/non-existence of a picture on the card is identified;

2) a timing at which existence/non-existence of suits arranged in line along a first side of the card or the number of the suits arranged in line along the first side is identified;

3) a timing at which existence/non-existence of suits arranged in line along a second side of the card or the number of the suits arranged in line along the second side is identified; and 4) a timing at which a final score is determined.

3. The card game apparatus according to claim 1, wherein as the squeeze motion, plural kinds of squeeze motions are set according to conditions for discontinuing the squeeze motion; and the processor holds a squeeze selection table showing relationships between progress states of the card game and squeeze motions to be selected according to the progress states, and selects one squeeze motion from the squeeze selection table according to a progress state of the card game.

4. The card game apparatus according to claim 3, wherein the plural kinds of squeeze motions include a plurality among:

1) a first squeeze motion of discontinuing the squeeze motion at a branching timing at which it is identified that the predicted score reaches a target score;

2) a second squeeze motion of discontinuing the squeeze motion at a branching timing at which a final score is decided;

3) a third squeeze motion of discontinuing the squeeze motion at a branching timing at which it is identified that the predicted score is below an opponent's score; and 4) a turn-over motion of turning over the card from the back surface to the front surface without including the squeeze motion.

5. The card game apparatus according to claim 1, wherein the processor is configured to change speed of the squeeze motion; and the processor is configured to change the speed of the squeeze motion according to a currently acquired score at the branching timing.

6. The card game apparatus according to claim 1, wherein the processor is configured to determine whether the squeeze motion is to be performed or not, according to a progress state of the card game.

7. A game image generating method comprising the steps of:

generating, by a processor, a squeeze image to show on a display a squeeze motion of a card being turned over from an end, from a back surface to a front surface;

controlling, by the processor, progress of a card game;

determining, by the processor and for at least one of a plurality of branching timings, a predicted score using a part of one or more suits on the card that appear during the squeeze motion;

determining, by the processor, whether or not the squeeze motion is at one of the plurality of branching timings at which the predicted score changes;

automatically discontinuing, by the processor, the squeeze motion based on the predicted score; and displaying, on the display by a display controller, the squeeze image generated by the processor.

* * * * *